United States Patent
Kurokawa et al.

(10) Patent No.: US 11,492,469 B2
(45) Date of Patent: Nov. 8, 2022

(54) THERMOPLASTIC ELASTOMER COMPOSITION

(71) Applicant: Sumitomo Chemical Company, Limited, Tokyo (JP)

(72) Inventors: Ryosuke Kurokawa, Ichihara (JP); Yukari Hiraguchi, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 72 days.

(21) Appl. No.: 17/203,908

(22) Filed: Mar. 17, 2021

(65) Prior Publication Data
US 2021/0301112 A1    Sep. 30, 2021

(30) Foreign Application Priority Data
Mar. 24, 2020   (JP) .............................. JP2020-052225

(51) Int. Cl.
| | |
|---|---|
| *C08L 23/16* | (2006.01) |
| *C08L 23/12* | (2006.01) |
| *C08L 23/08* | (2006.01) |

(52) U.S. Cl.
CPC ........... *C08L 23/0823* (2013.01); *C08L 23/12* (2013.01); *C08L 23/16* (2013.01); *C08L 2205/025* (2013.01); *C08L 2205/03* (2013.01); *C08L 2207/02* (2013.01)

(58) Field of Classification Search
None
See application file for complete search history.

(56) References Cited

U.S. PATENT DOCUMENTS

| | | | |
|---|---|---|---|
| 6,500,900 B1 | 12/2002 | Itoh | |
| 2003/0130400 A1 | 7/2003 | Shin et al. | |
| 2007/0251572 A1* | 11/2007 | Hoya | C08L 53/02 174/110 SR |

FOREIGN PATENT DOCUMENTS

| | | | |
|---|---|---|---|
| JP | 2001123027 A | | 5/2001 |
| JP | 2001200116 A | | 7/2001 |
| JP | 2001335641 A | | 12/2001 |
| JP | 2006175825 A | * | 7/2006 |
| JP | 2006291166 A | | 10/2006 |

OTHER PUBLICATIONS

Partial European Search Report dated Sep. 24, 2021 in EP Application No. 21160156.2.

* cited by examiner

*Primary Examiner* — Richard A Huhn
(74) *Attorney, Agent, or Firm* — Panitch Schwarze Belisario & Nadel LLP

(57) ABSTRACT

A thermoplastic elastomer composition including (A) ethylene rubber by 10 to 90 wt %, and (B) propylene polymer by 10 to 90 wt %, where a total amount of the thermoplastic elastomer composition is 100 wt %, is provided. A pressed sheet obtained by press-molding the thermoplastic elastomer composition under molding conditions has a sink-in temperature of 115° C. or higher. The sink-in temperature is measured based on JIS K7196-1991 as a temperature measured when a pressure load sinks in from a sheet surface by 100 μm. The molding conditions are such that the thermoplastic elastomer composition is hot press molded at a temperature of 200° C. with a maximum pressure of 10 MPa for 5 min, and thereafter cold press molded at a temperature of 23° C. with a maximum pressure of 10 MPa for 5 min, so as to prepare the pressed sheet.

6 Claims, No Drawings

THERMOPLASTIC ELASTOMER COMPOSITION

CROSS-REFERENCE TO RELATED APPLICATIONS

This application claims priority under 35 U.S.C. § 119(b) to Japanese Application No. 2020-052225, filed Mar. 24, 2020, the disclosure of which is incorporated herein by reference in its entirety.

BACKGROUND OF THE INVENTION

Field of the Invention

The present disclosure relates to a thermoplastic elastomer composition.

Description of the Related Art

Thermoplastic elastomer compositions such as olefin thermoplastic elastomer compositions with various advantages such as high processability have been preferably used in a wide range of fields such as automobile parts (see JP-A-2001-335641, for example).

SUMMARY OF THE INVENTION

For a skin material for automobile parts such as automobile interiors such as door trims and instrument panels, it is quite often preferable that the skin material have a surface pattern or shape such as an embossed pattern (Shibo in Japanese) for its outer appearance. In a case where a thermoplastic elastomer composition is processed into an embossed sheet, some post-embossing processing conditions such as vacuum molding, would possibly result in disappearance of the embossed pattern, and therefore a solution for this drawback has been required.

In view of such circumstances, an object to be solved by the present disclosure is to provide a thermoplastic elastomer composition capable of maintaining patterns and shapes such as embossing even after subjected to severe conditions such as vacuum molding, attaining excellent processability, and giving excellent outer appearance to a molded product molded therefrom.

In view of these circumstances, the present inventor diligently studied the problem, thereby accomplishing the present invention.

That is, the first invention of the present application is as follows:

[1]
a thermoplastic elastomer composition comprising: (A) ethylene rubber by 10 to 90 wt %; and (B) propylene polymer by 10 to 90 wt %, where a total amount of the thermoplastic elastomer composition is 100 wt %,
wherein a pressed sheet obtained by press-molding the thermoplastic elastomer composition under molding conditions has a sink-in temperature of 115° C. or higher, where the sink-in temperature is measured based on JIS K7196-1991 as a temperature measured when a pressure load sinks in from a sheet surface by 100 μm.
The molding conditions are such that the thermoplastic elastomer composition is hot press molded at a temperature of 200° C. with a maximum pressure of 10 MPa for 5 min, and thereafter cold press molded at a temperature of 23° C. with a maximum pressure of 10 MPa for 5 min, so as to prepare the pressed sheet.

The following [2] and [3] are a preferable aspect or embodiment of the first invention of the present application.
[2]
The thermoplastic elastomer composition according to [1], in which at least part of the (A) ethylene rubber is cross-linked.
[3]
The thermoplastic elastomer composition according to [1] or [2], further comprising: (E) mineral oil by 1 to 60 wt %, in which the thermoplastic elastomer composition comprises the (A) ethylene rubber by 10 to 89 wt % and the (B) propylene polymer by 10 to 89 wt %, where a total amount of the thermoplastic elastomer composition is 100 wt %.

The second invention of the present application is
[4]
a sheet comprising: (A) ethylene rubber by 10 to 90 wt %, and (B) propylene polymer by 10 to 90 wt %, where a total amount of the sheet is 100 wt %, and
the sheet has a sink-in temperature of 115° C. or higher, where the sink-in temperature is measured based on JIS K7196-1991 as a temperature measured when a pressure load sinks in from a sheet surface by 100 μm.

The following [5] and [6] are a preferable aspect or embodiment of the second invention of the present application.
[5]
The sheet according to (4), in which at least part of the (A) ethylene rubber is cross-linked.
[6]
The sheet according to (4) or (5), further comprising: (E) mineral oil by 1 to 60 wt %, in which the sheet comprises the (A) ethylene rubber by 10 to 89 wt % and the (B) propylene polymer by 10 to 89 wt %, where a total amount of the sheet is 100 wt %.

The third invention of the present application is
[7]
a thermoplastic elastomer composition, in which a ratio of a component (X) is in a range of 1 to 50 wt % with respect to 100 wt % of a total amount of elution, where the component (X) is a component eluting at elution temperatures between 100° C. and 140° C., and is measured by cross-fractionation chromatography under chromatography conditions (1) to (3) using a device comprising a temperature-programed elution separating section and a gel permeation chromatography section,
in the component (X), a ratio of a component (X1) with a logarithm log M of 5.6 or more is in a range of 6.0 to 45.0 wt %, with respect to 100 wt % of the total amount of the elution, where M is a molecular weight based on polystyrene, and
a gel fraction is in a range of 5.0 to 50 wt %,
the chromatography conditions (1) to (3) are:
(1) the temperature-programed elution separating section is maintained at 100° C. for 10 min, after an o-dichlorobenzene solution of the thermoplastic elastomer composition is injected in the temperature-programed elution separating section, the o-dichlorobenzene solution comprising the thermoplastic elastomer composition by a concentration of 1 mg/mL;
(2) the temperature in the temperature-programed elution separating section is cooled down to −5° C. at a rate of 2.0° C./min, and is maintained at −5° C. for 30 min, and thereafter an amount of elution at −5° C. is measured; and
(3) the temperature in the temperature-programed elution separating section is increased at a rate of 40° C./min to a target temperature, and is maintained at the target temperature for 30 min, and thereafter an amount of elution at the target temperature is measured, where the operation (3) is repeated for three target temperatures, 50° C., 100° C., and 140° C.

The following [8] to [10] are a preferable aspect or embodiment of the third invention of the present application.

[8]

The thermoplastic elastomer composition according to [7], in which the cross-fractionation chromatography shows that a component (α) eluting at an elution temperature of −5° C. is 70 wt % or less with respect to 100 wt % of the total amount of the elution.

[9]

The thermoplastic elastomer composition according to [7] or [8], in which the cross-fractionation chromatography shows that a component (β) eluting at elution temperatures between −5° C. and 50° C. is in a range of 1 to 39 wt % with respect to 100 wt % of the total amount of the elution.

[10]

The thermoplastic elastomer composition according to any one of [7] to [9], in which the cross-fractionation chromatography shows that a component (γ) eluting at elution temperatures between 50° C. and 100° C. is in a range of 0.1 to 39 wt % with respect to 100 wt % of the total amount of the elution.

According to the present invention, it is possible to provide a thermoplastic elastomer composition capable of maintaining patterns and shapes such as embossing even after subjected to processing at relatively severe conditions such as vacuum molding, attaining excellent processability, and giving excellent outer appearance to a molded product molded therefrom.

DETAILED DESCRIPTION OF THE PREFERRED EMBODIMENTS (First Invention of Present Application)

The first invention of the present application is a thermoplastic elastomer composition comprising (A) ethylene rubber by 10 to 90 wt % and (B) propylene polymer by 10 to 90 wt %, where a total amount of the thermoplastic elastomer composition is 100 wt %, in which a pressed sheet obtained by press-molding the thermoplastic elastomer composition under molding conditions has a sink-in temperature of 115° C. or higher, where the sink-in temperature is measured based on JIS K7196-1991 as a temperature measured when a pressure load sinks in from a pressed sheet surface by 100 μm.

Here, the molding conditions of the pressed sheet are as follows.

The molding conditions are such that the thermoplastic elastomer composition is hot press molded at a temperature of 200° C. with a maximum pressure of 10 MPa for 5 min, and thereafter cold press molded at a temperature of 23° C. with a maximum pressure of 10 MPa for 5 min, so as to prepare the pressed sheet.

Sink-In Temperature

The sink-in temperature is a temperature measured based on JIS K7196-1991 (Testing method for softening temperature of thermoplastics film and sheeting by thermomechanical analysis). The sink-in temperature is as a temperature when a pressure load sinks in a sheet by 100 μm from a surface of the sheet. More specifically, the sink-in temperature may be measured by a thermomechanical analysis apparatus based on the method stipulated in JIS K7196-1991 (Testing method for softening temperature of thermoplastics film and sheeting by thermomechanical analysis), and further specifically the sink-in temperature can be measured by the following method.

From a portion vicinity of the center of a pressed sheet prepared according to the molding conditions, a test piece of 5.0 mm in height, 5.0 mm in length, and 0.50 mm in thickness is cut out, and the sinking-in is measured in the thickness direction. The pressure load used has a column shape of 1.0 mm in diameter and 2 mm in length at the tip. The sink-in temperature is a temperature when the pressure load sinks in by 100 μm under application of a force of 780 mN thereon. As more detailed conditions, for example, conditions described in Example of the present application can be adopted.

The first invention of the present application is configured such that the sink-in temperature is 115° C. or higher and that the other conditions defined in Claim 1 of the present application are met, whereby the first invention of the present application can provide a thermoplastic elastomer composition capable of maintaining patterns and shapes such as embossing even after subjected to severe conditions such as vacuum molding, attaining excellent processability, and giving excellent outer appearance to a molded product molded therefrom. The sink-in temperature may be preferably in a range of 125 to 170° C., more preferably in a range of 130 to 165° C., or further preferably in a range of 135 to 160° C.

Use of the thermoplastic elastomer composition according to the third invention of the present application is advantageous in many cases in order to attain a sink-in temperature of 115° C. or higher. More specifically, by configured such that the content (X1) is increased in the third invention of the present application, it is possible to increase the sink-in temperature.

The first invention of the present application is a thermoplastic elastomer composition comprising (A) ethylene rubber by 10 to 90 wt % and (B) propylene polymer by 10 to 90 wt %, where a total amount of the thermoplastic elastomer composition is 100 wt %.

The content of the (A) ethylene rubber is generally in a range of 10 to 90 wt %, preferably in a range of 26 to 70 wt %, or more preferably in a range of 36 to 55 wt %. For the sake of rubber elasticity and softness suitable for use as an interior skin material, the content of the (A) ethylene rubber is generally set to 10 wt % or more. Moreover, for the sake of moldability and retainability of shibo (embossed pattern) in severe high-temperature processing, the content of the (A) ethylene rubber is generally set to 90 wt % or less.

The content of the (B) propylene polymer is generally 10 to 90 wt %, preferably in a range of 16 to 45 wt %, more preferably in a range of 26 to 40 wt %. For the sake of moldability and retainability of shibo (embossed pattern), the content of the (B) propylene polymer is generally set to 10 wt % or more.

Moreover, for the sake of softness suitable for use as an interior skin material, the content of the (B) propylene polymer is generally set to 90 wt % or less.

(A) Ethylene Rubber

The (A) ethylene rubber constituting the thermoplastic elastomer composition according to one embodiment of the first invention of the present application is a polymer comprising, by 50 to 90 wt %, a monomer unit derived from ethylene, and a monomer unit derived from at least one selected from the group consisting of propylene and C4 to C15 α-olefins (where a total amount of the ethylene rubber is 100 wt %). The (A) ethylene rubber may comprise a monomer unit derived from a monomer other than ethylene, and at least one selected from the group consisting of propylene and the C4 to C15 α-olefins (hereinafter, this monomer may be also referred to as "the other monomer" where appropriate).

Examples of propylene and the C4 to C15 α-olefins include propylene, 1-butene, 2-methylpropene, 1-pentene, 3-methyl-1-butene, 1-hexene, 4-methyl-1-pentene, 1-octene. For preparing the (A) ethylene rubber, only one type selected from the group consisting of propylene and the C4 to C15 α-olefins may be used or two or more types selected from the group consisting of propylene and the C4 to C15 α-olefins may be used. The monomer unit derived from at least one selected from the group consisting of propylene and the C4 to C15 α-olefins may be preferably a monomer unit derived from propylene, a monomer unit derived from 1-butene, or a monomer unit derived from 1-octene, or more preferably a monomer unit derived from propylene.

The content of the monomer unit derived from ethylene in the (A) ethylene rubber is in a range of 50 to 90 wt %, more preferably in a range of 55 to 85 wt %, or more preferably in a range of 60 to 75 wt % (where the total amount of the ethylene rubber is 100 wt %).

The content of the monomer unit derived from at least one selected from the group consisting of propylene and the C4 to C15 α-olefins in the (A) ethylene rubber is in a range of 10 to 50 wt %, more preferably in a range of 15 to 45 wt %, or more preferably in a range of 25 to 40 wt % (where the total amount of the ethylene rubber is 100 wt %).

The content of the monomer unit derived from ethylene in the (A) ethylene rubber and the content of the monomer unit derived from at least one monomer selected from the group consisting of propylene and the C4 to C15 α-olefins in the (A) ethylene rubber may be obtained by infrared spectroscopy. More specifically, infrared absorption spectrum is measured by using an infrared spectrometer, and the content of the monomer unit derived from ethylene in the (A) ethylene rubber and the content of the monomer unit derived from at least one monomer selected from propylene and the C4 to C15 α-olefins in the (A) ethylene rubber are calculated out according to the method described in "characterization of polyethylene by infrared absorption spectra (*Sekigai Kyushu Supekutoru niyoru polyethylene no characterization*) (written by Takayama, Usamai, et al.)" or a method described in "Die Makromolekulare Chemie, 177, 461 (1976) (written by McRae, M. A., MadamS, W. F. et al.)."

The (A) ethylene rubber may comprise a monomer unit derived from a monomer other than ethylene and the at least one selected from the group consisting of propylene and the C4 to C15 α-olefins. Examples of the other monomer include C4 to C8 conjugate dienes such as 1,3-butadiene, 2-methyl-1,3-butadiene, 1,3-pentadiene, and 2,3-dimethyl-1,3-butadiene; C5 to C15 non-conjugate dienes such as dicyclopentadiene, 5-ethylidene-2-norbornene, 1,4-hexadiene, 1,5-dicyclooctadiene, 7-methyl-1,6-octadiene, and 5-vinyl-2-norbornene; carbonyl vinyl esters such as vinyl acetate; unsaturated carboxylic esters such as methyl acrylate, ethyl acrylate, butyl acrylate, methyl methacrylate, and ethyl methacrylate; unsaturated carboxylates such as acrylate, and methacrylate; and the like. The other monomer may be preferably a C5 to C15 non-conjugate diene, or more preferably 5-ethylidene-2-norbornene or dicyclopentadiene. The (A) ethylene rubber may comprise two or more kinds of monomer units derived from the other monomers.

In a case where the (A) ethylene rubber comprises a monomer unit derived from a monomer unit other than ethylene and the at least one monomer selected from the group consisting of propylene and the C4 to C15 α-olefins, a content of the monomer unit derived from the other monomer may be preferably in a range of 1 to 30 wt %, more preferably in a range of 2 to 20 wt %, or further preferably in a range of 3 to 15 wt % (where the total amount of ethylene rubber is 100 wt %). The content of the monomer unit derived from the other monomer may be obtained by the infrared spectroscopy. More specifically, a peak strength of a peak derived from the other monomer in the (A) ethylene rubber is measured by using an infrared spectrometer, and the content of the monomer unit derived from the other monomer in the (A) ethylene rubber is calculated out from the peak strength.

Examples of the (A) ethylene rubber include ethylene-propylene copolymer, ethylene-1-butene copolymer, ethylene-1-hexene copolymer, ethylene-1-octene copolymer, ethylene-propylene-1-butene copolymer, ethylene-propylene-1-hexene copolymer, ethylene-propylene-1-octene copolymer, ethylene-propylene-5-ethylidene-2-norbornene copolymer, ethylene-propylene-dicyclopentadiene copolymer, ethylene-propylene-1,4-hexadiene copolymer, ethylene-propylene-5-vinyl-2-norbornene copolymer, and the like. The (A) ethylene rubber may comprise one kind or may comprise two or more kinds. The (A) ethylene rubber may be preferably ethylene-propylene copolymer, or ethylene-propylene-5-ethylidene-2-norbornene copolymer.

Examples of a method of producing the (A) ethylene rubber include a method comprising copolymerizing ethylene and the at least one monomer selected from the group consisting of propylene and C4 to C15 α-olefins, in the presence of a well-known catalyst such as a Ziegler-Natta catalyst, a metallocene catalyst, a non-metallocene catalyst or the like. Examples of a polymerization method include slurry polymerization, solution polymerization, bulk polymerization, gas phase polymerization, and the like.

It is preferable that the (A) ethylene rubber be at least partially cross-linked.

The (A) ethylene rubber has a Mooney viscosity ($ML_{1+4}$ 100° C.) measured at 100° C., which is preferably in a range of 5 to 300, or more preferably in a range of 10 to 200. Moreover, the Mooney viscosity ($ML_{1+4}$ 100° C.) is measured based on JIS K6300, and what is meant by "($ML_{1+4}$ 100° C.)" is as follows.

M: Mooney viscosity
L: A large rotor was used
100° C.: Measurement temperature
1+4: The measurement value obtained when a sample is heated for 1 min and then stirred for 4 min with the rotor rotated at 2 rpm A density of the (A) ethylene rubber was generally in a range of 0.850 to 0.900 g/cm$^3$, or more preferably in a range of 0.870 to 0.890 g/cm$^3$.

(B) Propylene Polymer

The (B) propylene polymer constituting the thermoplastic elastomer composition according to the embodiment of the first invention of the present application is a polymer in which the content of the monomer unit derived from propylene is more than 50 wt % (where a total amount of the propylene polymer is 100 wt %). Examples of the (B) propylene polymer include propylene homopolymer, propylene random copolymers, and propylene polymer materials, and the (B) propylene polymer may be preferably propylene homopolymer or a propylene polymer material. The (B) propylene polymer may comprise one kind of these or may comprise two or more kinds of these.

Examples of propylene random copolymer include:
(1) propylene-ethylene copolymer in which a content of a monomer unit derived from propylene is in a range of 90 to 99.5 wt %, and a content of a monomer unit derived from ethylene is in a range of 0.5 to 10 wt % (where a sum of the content of the monomer unit derived from propylene and the content of the monomer unit derived from ethylene is 100 wt %;
(2) propylene-ethylene-α-olefin random copolymer in which a content of a monomer unit derived from propylene is in a range of 81 to 99 wt %, a content of a monomer unit derived from ethylene is in a range of 0.5 to 9.5 wt %, and a content of a monomer unit derived from C4 to C10 α-olefins is in a range of 0.5 to 9.5 wt % (where a sum of the contents of the monomer unit derived from propylene, the monomer unit derived from ethylene, and the monomer unit derived from the C4 to C10 α-olefins is 100 wt %); and
(3) propylene-α-olefin random copolymer in which a content of a monomer unit derived from propylene is in a range of 90 to 99.5 wt %, and a content of a monomer unit derived from C4 to C10 α-olefins is in a range of 0.5 to 10 wt % (where a sum of the contents of the monomer unit derived from propylene and the monomer unit derived from C4 to C10 α-olefins is 100 wt %).

Examples of C4 to C10 α-olefins in the propylene-ethylene-α-olefin random copolymer and the propylene-α-olefin random copolymer include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, 2,2,4-trimethyl-1-pentene, and the like.

Examples of a method of producing the propylene homopolymer and the propylene random copolymer include well-known polymerization methods such as slurry polymerization, solution polymerization, bulk polymerization, or gas phase polymerization, using a well-known olefin polymerization catalyst such as a Ziegler-Natta catalyst, or a well-known complex including a metallocene catalyst or a non-metallocene catalyst.

The propylene polymer material is a polymer material including a propylene homopolymer component (I) and an ethylene copolymer component (II) including a monomer unit derived from at least one selected from the group consisting of propylene and C4 to C10 α-olefins, and a monomer unit derived from ethylene. A content of the propylene homopolymer component (I) in the propylene polymer material is generally in a range of 70 to 95 wt %, or preferably in a range of 75 to 95 wt %, and a content of the ethylene copolymer component (II) in the propylene polymer material is generally in a range of 5 to 30 wt %, or preferably in a range of 5 to 25 wt % (where a total amount of the propylene polymer material is 100 wt %).

Examples of the C4 to C10 α-olefins in the ethylene copolymer component (II) include 1-butene, 1-pentene, 1-hexene, 1-heptene, 1-octene, 1-nonene, 1-decease, 1-undecene, 1-dodecene, 1-tridecene, 1-tetradecene, 1-pentadecene, 1-hexadecene, 1-heptadecene, 1-octadecene, 1-nanodecene, 1-eicosene, 3-methyl-1-butene, 3-methyl-1-pentene, 4-methyl-1-pentene, 2-ethyl-1-hexene, 2,2,4-trimethyl-1-pentene, and the like. The C4 to C10 α-olefins may be preferably 1-butene, 1-hexene, or 1-octene. Only one kind or two or more kinds of the C4 to C10 α-olefins may be used.

A content of the monomer unit derived from ethylene in the ethylene copolymer component (II) is generally in a range of 22 to 80 wt %, preferably in a range of 25 to 70 wt %, or more preferably in a range of 27 to 60 wt %. In the ethylene copolymer component (II), a content of the monomer unit derived from the at least one selected from the group consisting of propylene and the C4 to C10 α-olefins is generally in a range of 20 to 78 wt %, preferably in a range of 30 to 75 wt %, or more preferably in a range of 40 to 73 wt % (where a sum of the monomer unit derived from the at least one selected from the group consisting of propylene and the C4 to C10 α-olefins and the monomer unit derived from ethylene is 100 wt %). The contents of the monomer unit derived from the at least one selected from the group consisting of propylene and the C4 to C10 α-olefins and the monomer unit derived from ethylene can be obtained by infrared spectroscopy.

Examples of the ethylene copolymer component (II) include propylene-ethylene copolymer, ethylene-(1-butene) copolymer, ethylene-(1-hexene) copolymer, ethylene-(1-octene) copolymer, propylene-ethylene-(1-butene) copolymer, propylene-ethylene-(1-hexene) copolymer, propylene-ethylene-(1-octene) copolymer, and the like, in which the propylene-ethylene copolymer and the propylene-ethylene-(1-butene) copolymer are preferable. The ethylene copolymer component (II) may be a random copolymer or a block copolymer.

The propylene polymer material may be produced by multi-staged polymerization using a polymerization catalyst(s). For example, the propylene polymer material may be produced by performing a first-stage polymerization for producing a propylene homopolymer component (I) and performing a second-stage polymerization for producing an ethylene copolymer component (II).

Examples of the polymerization catalyst(s) for use in producing the propylene polymer material include Ziegler-Natta catalysts, Ziegler-Natta catalysts, a catalyst system including a transition metal compound of Group 4 element with a cyclopentadienyl ring and an alkylaluminoxane, a transition metal compound of Group 4 element with a cyclopentadienyl ring, a compound reactive with the transition metal compound of Group 4 element with a cyclopentadienyl ring to thereby form an ionic complex, a catalyst system including an organic aluminum compound, and the like catalysts.

Moreover, the method may use a preliminary polymerization catalyst in the presence of the polymerization catalyst(s). Examples of the preliminary catalyst include the catalyst systems described in JP-A-S61-218606, JP-A-S61-287904, JP-A-H5-194685, JP-A-H7-216017, JP-A-H9-316147, JP-A-H10-212319, and JP-A-2004-182981.

The polymerization method for producing the propylene polymer material may be bulk polymerization, solution polymerization, slurry polymerization, gas phase polymerization, or the like. Examples of inert hydrocarbon solvent for use in the solution polymerization and slurry polymerization include propane, butane, isobutane, pentane, hexane, heptane, octane, and the like. The polymerization may include two or more kinds of these methods in combination, and may be batchwise or continuous. The polymerization method for producing the propylene polymer material may be preferably continuous gas phase polymerization, or bulk-gas phase polymerization in which bulk polymerization and gas phase polymerization are continuously carried out.

The (B) propylene polymer includes a xylene soluble component (CXS component), which is soluble in xylene at 20° C., and a specific viscosity ([$\eta$cxs]) of the xylene soluble component is preferably in a range of 1.0 to 8.0 dl/g, more preferably in a range of 2.0 to 7.0 dl/g, or further preferably in a range of 3.0 to 6.5 dl/g. A ratio of the [$\eta$cxs] with respect to a specific viscosity ([η]cxis]) of an insoluble component (CXIS component) of the (B) propylene polymer is preferably in a range of 2.0 to 12.0, where the CXIS component is insoluble in xylene at 20° C.

The specific viscosities are worked out as follows. By using an Ubbelohde type viscometer, a reduced viscometer is measured in tetralin at 135° C., and a specific viscosity is worked out from the reduced viscosity thus obtained, by extrapolation according to the calculation method described on Page 491 of "Polymer Solution, Polymer Experiment Study 11 (Kobunshi Yoeki, Kobunshi Jikkengaku 11)" (1982, published by KYORITSU SHUPPAN CO., LTD.).

Here, the CXS component and the CXIS component are worked out by the following method.

About 5 g of the propylene polymer is completely dissolved in 500 ml of boiled xylene, thereby obtained a xylene solution. The xylene solution thus obtained is gradually cooled down to 20° C., and subjected to state adjustment at 20° C. for 4 hours or longer. Then, precipitates are filtered out from the solution. The precipitates are the CXIS component and a component obtained by separating a solvent from the solution is the CXS component.

A melt flow rate of the (B) propylene polymer is preferably in a range of 0.1 to 30 g/10 min, more preferably in a range of 0.2 to 12 g/10 min, further preferably in a range of 0.3 to 7 g/10 min, or especially preferably in a range of 0.4 to 3 g/10 min, where the melt flow rate is measured at 230° C. with a load of 21.18 N according to JIS K7210. For the sake of retainability of embossed patterns (shibo) at high temperatures, it is preferable that the melt flow rate of the (B) propylene polymer be 0.1 g/10 min or higher. For the sake of moldability, it is preferable that the melt flow rate of the (B) propylene polymer be 30 g/10 min or lower.

An isotactic pentad fraction of the (B) propylene polymer is generally 0.95 or higher or preferably 0.98 or higher, where the isotactic pentad fraction is measured with 13C-Nucleaer Magnetic Resonance spectrometer (NMR).

Here, the isotactic pentad fraction is a fraction of propylene monomer unit at a center of an isotactic chain in a pentad unit in a molecular chain of the (B) propylene polymer, or in the other words, a fraction of a propylene monomer unit in a chain (mmmm) in which five propylene monomer units are chained via meso bonding. Measurement of the isotactic pentad fraction is carried out according to the method described in Macromolecules, 6,925 (1973), A. Zambelli at el., that is, a measurement method using 13C-NMR.

More specifically, the isotactic pentad fraction is a ratio of an area of an NMR peak belonging to mmmm with respect to an absorption peak of a methyl carbon region measured by 13C-NMR spectra.

A melting temperature of the (B) propylene polymer may be generally 100° C. or higher. Melting temperatures of the propylene homopolymer and the propylene polymer material may be preferably 155° C. or higher, or more preferably 160° C. or higher. A melting temperature of the propylene random copolymer may be preferably 130° C. or higher, or more preferably 135° C. or higher. Moreover, the melting temperature of the (B) propylene polymer may be generally 175° C. or lower. In the present disclosure, the melting temperatures are a peak temperature in a heat absorption peak with a greatest peak temperature on a differential scanning calorimetry curve in heating operation measured by a differential scanning calorimeter. Measurement conditions of the differential scanning calorimetry curve by the differential scanning calorimeter are as follows.

Measurement Conditions

Cooling operation: The (B) propylene polymer is melted at 220° C., and cooled down from 220° C. to −90° C. at a rate of 5° C./min.

Heating operation: Immediately after the cooling from 220° C. to −90° C., the (B) propylene polymer is heated from −90° C. to 200° C. at a rate of 5° C./min.

(C) Ethylene Polymer Including, by 90 wt % or More, a Monomer Unit Derived from Ethylene The thermoplastic elastomer composition according to the present embodiment may include a (C) ethylene polymer including, by 90 wt % or more, a monomer unit derived from ethylene (where a total amount of the ethylene polymer is 100 wt %). The (C) ethylene polymer including, by 90 wt % or more, a monomer unit derived from ethylene may include a monomer unit derived from a monomer other than ethylene.

Examples of the other monomer other than ethylene include C3 to C10 α-olefins, C4 to C8 conjugate dienes such as 1,3-butadiene, 2-methyl-1,3-butadiene, 1,3-pentadiene, and 2,3-dimethyl-1,3-butadiene; C5 to C15 non-conjugate dienes such as dicyclopentadiene, 5-ethylidene-2-norbornene, 1,4-hexadiene, 1,5-dicyclooctadiene, 7-methyl-1,6-octadiene, and 5-vinyl-2-norbornene; carbonyl vinyl esters such as vinyl acetate; unsaturated carboxylic esters such as methyl acrylate, ethyl acrylate, butyl acrylate, methyl methacrylate, and ethyl methacrylate; unsaturated carboxylates such as acrylate and methacrylate; and the like.

Examples of the (C) ethylene polymer including, by 90 wt % or more, a monomer unit derived from ethylene include ethylene homopolymer, and an ethylene copolymer including a monomer unit derived from ethylene and a monomer unit derived from a monomer other than ethylene. The (C) ethylene polymer, as an ethylene polymer, including, by 90 wt % or more, a monomer unit derived from ethylene may include only one kind of the monomer unit derived from a monomer other than ethylene or may include two or more kinds of the monomer units derived from monomers other than ethylene. The (C) ethylene polymer including, by 90 wt % or more, a monomer unit derived from ethylene may be preferably ethylene homopolymer, ethylene-propylene copolymer, ethylene-1-butene copolymer, ethylene-1-pentene copolymer, ethylene-4-methyl-1-pentene copolymer, ethylene-1-hexene copolymer, or ethylene-1-octene copolymer, or may be more preferably ethylene homopolymer, ethylene-1-butene copolymer, or ethylene-1-hexene copolymer.

A melt flow rate of the (C) ethylene polymer including, by 90 wt % or more, a monomer unit derived from ethylene is not particularly limited, but may be preferably in a range of 0.01 to 200 g/10 min, more preferably in a range of 0.05 to 100 g/10 min, or further preferably in a range of 1.0 to 20 g/10 min, where the melt flow rate is measured at 190° C. under a load of 21.18 N according to JIS K7210.

A density of the (C) ethylene polymer including, by 90 wt % or more, a monomer unit derived from ethylene is not particularly limited, but may be preferably in a range of 0.91 to 0.97 g/cm$^3$, where the density is measured according to JIS K7112.

The (C) ethylene polymer including, by 90 wt % or more, a monomer unit derived from ethylene may be produced by polymerizing ethylene in the presence of a polymerization catalyst such as a Ziegler-Natta catalyst or a metallocene catalyst. The polymerization method may include solution polymerization, bulk polymerization, slurry polymerization, gas phase polymerization, or the like, and may be a combination of two or more of these polymerizations.

The (C) ethylene polymer including, by 90 wt % or more, a monomer unit derived from ethylene to be used is not particularly limited in terms of an amount thereof, but a content of the (C) ethylene polymer including, by 90 wt % or more, a monomer unit derived from ethylene in the thermoplastic elastomer composition may be preferably 30 wt % or less, or more preferably 20 wt % or less, where the amount of the thermoplastic elastomer composition is 100 wt %.

(D) Cross-Linking Agent

The thermoplastic elastomer composition according to the present embodiment may include a (D) cross-linking agent. Examples of the (D) cross-linking agent include organic peroxides, sulfur compounds, alkyl phenol resins, and the like, and the organic peroxides are preferable.

Examples of the organic peroxides include ketone peroxides, diacyl peroxides, hydroperoxides, dialkyl peroxides, peroxy ketals, alkyl peresters, percarbonates, peroxy decarbonates, peroxy esters, and the like. More specific examples of the organic peroxides include dicumyl peroxide, 2,5-dimethyl-2,5-di(tert-butylperoxy)hexane, 2,5-dimethyl-2,5-di(tert-butylperoxy)hexyne, 1,3-bis(tert-butylperoxyisopropyl)benzene, tert-butyl cumyl peroxide, di-tert-butylperoxide, 2,2,4-trimethylpentyl-2-hydroperoxide, diisopropyl benzohydroperoxide, cumene peroxide, tert-butyl peroxide, 1,1-di(tert-butylperoxy)3,5,5-trimethylcyclohexane, 1,1-di-tert-butylperoxycyclohexane, isobutylperoxide, 2,4-dichlorobenzoylperoxide, o-methylbenzoylperoxide, bis-3,5,5-trimethylhexanoylperoxide, lauroyl peroxide, benzoyl peroxide, p-chlorobenzoyl peroxide, and the like. The organic peroxides may be used solely or two or more kinds of the organic peroxides may be used in combination.

The (D) cross-linking agent to be used is not particularly limited in terms of an amount thereof but a content of the (D) cross-linking agent in the thermoplastic elastomer composition may be preferably in a range of 0.01 to 3.0 wt %, more preferably in a range of 0.05 to 2 wt %, or further preferably in a range of 0.1 to 1 wt %, where the thermoplastic elastomer composition is 100 wt %.

The (D) cross-linking agent may be used in combination of a cross-linking aid agent, for the sake of a greater degree of cross-linking of the (A) ethylene rubber. The cross-linking aid may preferably be a compound having two or more double bonds.

Examples of such a cross-linking aid include: peroxide cross-linking aids such as N,N-m-phenylene bismaleimide, tolylenebismaleimide, p-quinone dioxime, nitrosobenzene, diphenyl guanidine, and trimethylol propane; divinyl benzene, triallyl cyanurate, triallyl isocyanurate, ethylene glycol dimethacrylate, polyethylene glycol dimethacrylate, trimethylol propane trimethacrylate, polyethylene glycol dimethacrylate, trimethylol propane trimethacrylate, allyl methacrylate, and the like. Trimethylol propane trimethacrylate is preferable.

The cross-linking aid to be used is not particularly limited in terms of an amount thereof but a content of the cross-linking aid in the thermoplastic elastomer composition may be preferably in a range of 0.01 to 10 wt %, more preferably in a range of 0.1 to 2 wt %, where the thermoplastic elastomer composition is 100 wt %.

(E) Mineral Oil

The thermoplastic elastomer composition according to the present disclosure may include a (E) mineral oil. Examples of the (E) mineral oil include high-boiling fractions of oils such as aroma mineral oils, naphthene mineral oils, and paraffin mineral oils, which have an average molecular weight in a range of 300 to 1500, and a pour point of 0° C. or lower. The paraffine mineral oils are preferable.

The (E) mineral oil may be blended in as an extender oil for the (A) ethylene rubber. Examples of a method of blending the (E) mineral oil in the (A) ethylene rubber may be a method of mechanically blending the (A) ethylene rubber and the (E) mineral oil by using a mixing device such as a roller or a BANBURY mixer, a method of preparing a mixture solution by adding a predetermined amount of the (E) mineral oil into a solution of the (A) ethylene rubber and, thereafter, removing a solvent from the mixture solution by a spray drying method, a steam stripping method, a super-critical drying using carbon dioxide, or the like separation method, a method including directly adding the oil into rubber of a latex state, stirring the rubber, and solidifying the rubber, or the like.

In a case where the (E) mineral oil is blended as an extender oil for the (A) ethylene rubber, a Mooney viscosity ($ML_{1+4}$ 100° C.) of the composition including the (E) mineral oil and the (A) ethylene rubber, which is measured at 100° C., is preferably in a range of 5 to 300, more preferably in a range of 40 to 200, or further preferably in a range of 50 to 100. Note that the Mooney viscosity ($ML_{1+4}$ 100° C.) is measured based on JIS K6300.

The amount of the (E) mineral oil is not particularly limited, but the content of the (E) mineral oil in the thermoplastic elastomer composition may be preferably in a range of 1 to 60 wt %, more preferably in a range of 10 to 50 wt %, or further preferably in a range of 15 to 45 wt %, where the thermoplastic elastomer composition is 100 wt %. Here, depending on the amount of the (E) mineral oil to be used, the content of the (A) ethylene rubber and/or the content of the (B) propylene polymer are/is decreased. For example, when the content of the (E) mineral oil is in a range of 1 to 60 wt %, the content of the (A) ethylene rubber is in a range of 10 to 89 wt % and the content of the (B) propylene polymer is in a range of 10 to 89 wt %.

Others

The thermoplastic elastomer composition according to the first invention of the present application may additionally include an additive other than the (A) to (E) (where only the (A) ethylene rubber and the (B) propylene polymer are essential components) or another thermoplastic elastomer resin. Examples of the other additive include inorganic fillers, organic fillers, fatty acid derivatives, anti-oxidant, weathering stabilizers, ultraviolet absorbents, thermal stabilizers, photostabilizers, anti-static agents, nucleating agents, coloring agents (such as inorganic pigments, organic pigments, and pigment dispersing agents), adsorbing agents, metal chlorides, flame retardants, silicone compounds, anti-friction agents, anti-microbial agents, anti-fungal agents, neutralizers, foaming agents, foaming nucleating agents, and the like. The additive may be used solely or two or more of the additive may be used in combination.

Examples of the anti-oxidant include phenol-based anti-oxidants, sulfur-based anti-oxidants, phosphor-based anti-oxidants, lactone-based anti-oxidants, vitamin-based anti-oxidants, and the like.

Examples of the ultraviolet absorbing agents include benzotriazole-based ultraviolet absorbing agents, triazine-based ultraviolet absorbing agents, anilide-based ultraviolet absorbing agents, benzophenone-based ultraviolet absorbing agents, and the like.

Examples of photostabilizers include hindered amine-based photostabilizers, benzoate-based photostabilizers, and the like.

Production of Thermoplastic Elastomer Composition

The thermoplastic elastomer composition according to the first invention of the present application may be produced by mixing the (A) ethylene rubber, the (B) propylene polymer, and if necessary, an additive of various kinds by a usual method with, for example, an ordinary extruder, a BANBURY mixer, a roller, a Brabender Plastograph, a kneader Brabender, or the like. It is preferable that the thermoplastic elastomer composition according to the first invention of the present application be produced by using an extruder, especially, a twin-screw extruder. All the components may be melted, mixed, and kneaded collectively, or some of the components may be mixed and then the rest of the components are added therein and melted, mixed, and kneaded. The melting, mixing, and kneading may be carried cut once or more than twice. A temperature in melting, mixing, and kneading may be preferably in a range of 150 to 300° C., or more preferably in a range of 180 to 250° C. Duration of the melting, mixing, and kneading may be preferably in a range of 20 sec to 30 min, or more preferably in a range of 30 sec to 20 min. The components to be mixed may be added in any order, and may be added at the same time.

For producing the thermoplastic elastomer composition according to the present disclosure, it is preferable that the (A) ethylene rubber and a cross-linkable resin component other than the (A) ethylene rubber be cross-linked, for the sake of realizing sufficient rubber elasticity, for example.

In order to perform the cross-linking, it is preferable that the cross-linking be performed by extrusion by adding, in an extruder, especially a twin-screw extruder, a cross-linking agent and/or a cross-linking aid of various kinds in addition to the resins as raw materials.

In a case where a method for producing the thermoplastic elastomer composition according to the first invention of the present application includes the step of cross-linking, the method may include a step of further adding another resin after the step of cross-linking. In this case, the step of cross-linking may be referred to as "step 1" and the step of further adding another resin after the step 1 may be referred to as "step 2." Depending on conditions of the step 1, almost all the amount of the (D) cross-linking agent such as an organic peroxide would be possibly consumed in the step 1, and therefore, the step 2 can be performed substantially in the absence of the organic peroxide. In such a case, the cross-linking or decomposition of the resin component would not substantially occur in the step 2. This makes it possible to adjust the thermoplastic elastomer composition in terms of the resin component, molecular weight distribution, gel fraction, and/or the like at a high degree of freedom. Especially, when a predetermined amount of a component (such as the (B) propylene polymer) easily degradable with the organic peroxide is added, a desired molecular weight distribution can be realized.

In the case of adopting such a method, a resin composition obtained in the step 1 would have a composition and a property different from the desired thermoplastic elastomer composition, the resin composition obtained in the step 1 thus may be referred to as "thermoplastic elastomer composition precursor."

The step 2 is not particularly limited, but may be carried out by adding the thermoplastic elastomer composition precursor thus obtained in the step 1 and another resin in an extruder, especially a twin-screw extruder similar to that used in the step 1, and performing extrusion. A temperature in the extrusion in the step 2 may be preferably in a range of 150 to 300° C., or more preferably in a range of 180 to 250° C. Duration of the heat processing in the step 2 is not particularly limited but may be preferably in a range of 10 sec to 30 min, or more preferably in a range of 20 sec to 10 min.

For the sake of performing the step 2 substantially in the absence of the cross-linking agent such as the organic peroxide, a temperature in the extrusion in the step 1 may be preferably in a range of 150 to 300° C., or more preferably in a range of 190 to 250° C. Duration of the heat processing in the step 1 is not particularly limited but may be preferably in a range of 10 sec to 30 min, or more preferably in a range of 20 sec to 10 min.

The thermoplastic elastomer composition may be preferably produced by a production method including the following step 1' and a step 2'.

Step 1': a step of melting, mixing, and kneading the (A) ethylene rubber and a (B1) propylene polymer in the presence of a cross-linking agent, so as to obtain a thermoplastic elastomer composition precursor; and Step 2': a step of melting, mixing, and kneading the thermoplastic elastomer composition precursor and a (B2) propylene polymer having a melt flow rate in a range of 0.3 to 2 g/10 min, so as to obtain a thermoplastic elastomer composition.

The method including the step 1' and the step 2' can give the thermoplastic elastomer composition a sink-in temperature of 115° C. or higher.

The (A) ethylene rubber used in the step 1' is generally a non-cross-linked ethylene rubber. It is preferable that at least part of the ethylene rubber is cross linked in the step1'.

The (B1) propylene polymer may be the (B) propylene polymer.

In order to give the thermoplastic elastomer composition the sink-in temperature of 115° C. or higher, it is preferable that the (B2) propylene polymer with a melt flow rate in a range of 0.3 to 2 g/10 min be the propylene homopolymer and/or the propylene polymer material.

In order to give the thermoplastic elastomer composition the sink-in temperature of 115° C. or higher, it is preferable that the (B1) propylene polymer be added by 11 to 29 wt % and the (B2) propylene polymer with a melt flow rate in a range of 0.3 to 2 g/10 min be added by 5 to 16 wt %, where the total amount of the thermoplastic elastomer composition is 100 wt %.

In order to give the thermoplastic elastomer composition the sink-in temperature of 115° C. or higher, the amount of the (D) cross-linking agent added in the step 2' may be preferably in a range of 0.01 to 3.0 wt %, more preferably in a range of 0.05 to 2.0 wt %, or further preferably in a range of 0.1 to 1.0 wt %, where the total amount of the thermoplastic elastomer composition is 100 wt %. The thermoplastic elastomer composition thus obtained may or may not include the (D) cross-linking agent. In a case where the (D) cross-linking agent used in the step 2' is an organic peroxide, almost all the amount of the organic peroxide is consumed in the step 2', and therefore, the thermoplastic elastomer composition thus obtained may not include the (D) cross-linking agent.

The thermoplastic elastomer composition according to the first invention of the present application may share its details with a thermoplastic elastomer composition according to a third invention of the present application described below. Depending on usages or properties desired, it is preferable that the thermoplastic elastomer composition according to the first invention of the present application have all or part of features and/or preferable technical features of the thermoplastic elastomer composition according to the third invention of the present application.

The thermoplastic elastomer composition according to the first invention of the present application is not particularly limited in terms of its shape when used, and may be processed or shaped into a desired shape as appropriate depending on usages or the like. The thermoplastic elastomer composition may be shaped into a sheet-like shape and used. Such a sheet containing the thermoplastic elastomer composition according to the first invention of the present application may share its details with a sheet according to a second invention of the present application described below. Depending on usages or properties desired, it is preferable that the sheet containing the thermoplastic elastomer composition according to the first invention of the present application have all or part of features and/or preferable technical features of the sheet according to the second invention of the present application.

(Second Invention of Present Application)

The second invention of the present application is a sheet including (A) ethylene rubber by 10 to 90 wt %, and (B) propylene polymer by 10 to 90 wt %, where a total amount of the sheet is 100 wt %, in which the sheet has a sink-in temperature of 115° C. or higher, where the sink-in temperature is measured based on JIS K7196-1991 as a temperature measured when a pressure load sinks in from a sheet surface by 100 μm.

The (A) ethylene rubber and the (B) propylene polymer constituting the sheet according to the second invention of the present application, and preferable features of the (A) ethylene rubber and the (B) propylene polymer are similar to those explained above for the first invention of the present application.

Configurations and production methods of a composition constituting the sheet according to the second invention of the present application, components that the sheet may include in addition to the (A) ethylene rubber and the (B) propylene polymer are similar to those explained above for the first invention of the present application.

A sink-in temperature of the sheet according to the second invention of the present application, which is measured based on JIS K7196-1991 and defined as a temperature of the sheet when a pressure load sinks in from a sheet surface by 100 μm, is similar to that explained above for the first invention of the present application in terms of its definition, measurement method, and preferable ranges.

The sheet according to the second invention of the present application may be preferably produced from the thermoplastic elastomer composition according to the first invention of the present application or the third invention of the present application described below.

A molding method for the sheet according to the second invention of the present application is not particularly limited and the sheet may be molded as appropriate by a method adopted in the technical field to which the second invention pertains. Examples of the molding method include press molding, extrusion molding, compression molding, injection molding, calender molding, blow molding, and the like.

The sheet according to the second invention of the present application is not limited to flat shapes but may be shaped into another shape. For producing a shaped sheet, a flat sheet may be produced, and then molded and shaped into a shaped sheet by vacuum molding or the like.

A thickness of the sheet according to the second invention of the present application is not particularly limited, and may be set as appropriate according to usage, but may be generally in a range of 0.01 to 50 mm, preferably in a range of 0.1 to 20 mm, or more preferably in a range of 0.2 to 10 mm.

A surface of the sheet according to the second invention of the present application may be flat and smooth, or may be processed to be not flat and smooth by embossing (shibo processing), matte processing, sand-blast processing, or the like processing.

Especially when the sheet is to be used as a skin material for automobile interiors, embossing (shibo processing) is preferable. Here, the embossing is not particularly limited in terms of its shapes, and may be not only shibo processing in a narrow sense for creating leather-like finish for outer appearance but also embossing for creating nashiji finish (pear-skin finish), wood-like finish, rock-like finish, sand-like finish, cloth-like finish, silk-like finish (fabric-like patterns), geometric patterns, and the like, which may be adopted as appropriate in consideration of usage and the like. In a case of the skin material for automobile interiors, the shibo processing in the narrow sense for creating leather-like finish for luxury outer appearance may be preferably adoptable.

In some cases, it is appropriate that surface roughness of the embossed surface is regulated according to ten-point average roughness ($R_{zjis}$). In such a case, the $R_{zjis}$ may be preferably in a range of 10 to 1000 μm, or more preferably in a range of 50 to 500 μm.

In a case of the skin material for automobile interiors, the sheet may be embossed (subjected to shibo processing) and shaped into a desired shape of an interior part by vacuum molding or the like thereafter. In such a case, such a problem may occur that the shibo pattern created on the surface of the sheet is shallower and/or larger than desired depth/size, or disappear undesirably, and it has been a need of reducing such a problem. The sheet according to the second invention of the present application and sheets obtainable from the elastomer resin compositions according to the first and third inventions of the present application are excellent in formability and outer appearance of products formed therefrom, and therefore can be suitably used especially for usage as skin material for automobile interiors.

In practical production of such a skin material for automobile interiors by vacuum molding or the like, it is preferable that the sheet according to the second invention of the present application and sheets obtainable from the elastomer resin compositions according to the first and third inventions of the present application be a laminate with a polyolefin foam such as polyethylene foam when being vacuum-molded. It should be noted that the description as to the thickness and the like of the sheets explains the thickness and the like of the sheet according to the second invention of the present application and sheets (top layer) obtainable from the elastomer resin compositions according to the first and third inventions of the present application, excluding the polyolefin foam.

It is preferable that at least part of the (A) ethylene rubber constituting the sheet according to the second invention of the present application be cross-linked. A cross-linking agent, a cross-linking aid, conditions of a cross-linking step, and the like for the cross-linking are similar to those explained for the first invention of the present application.

The sheet according to the second invention of the present application may preferably include the (E) mineral oil. A content of the (E) mineral oil may be preferably in a range of 1 to 60 wt %, more preferably in a range of 10 to 50 wt %, or further preferably in a range of 15 to 45 wt %, where the total amount of the sheet is 100 wt %. Details and a method of adding of the (E) mineral oils are similar to those explained for the first invention of the present application in the above.

The sheet according to the second invention of the present invention may be preferably produced from the thermoplastic elastomer composition according to the first invention of the present application or the thermoplastic elastomer composition according to the third invention of the present application. Depending on usage or properties required, the sheet according to the second invention of the present application may be preferably produced from a thermoplastic elastomer composition including all or part of features and/or preferably technical features of the thermoplastic elastomer composition according to the first invention of the present application and/or the thermoplastic elastomer composition according to the third invention of the present application. As an alternative, the sheet according to the second invention of the present application may preferably include all or part of such features and/or preferable technical features.

(Third Invention of Present Application)

The third invention of the present application is a thermoplastic elastomer composition, in which a ratio of a component (X) is in a range of 1 to 50 wt % with respect to 100 wt % of a total amount of elution, where the component (X) is a component eluting at elution temperatures between 100° C. and 140° C., and is measured by cross-fractionation chromatography (CFC) under chromatography conditions (1) to (3) using a device including a temperature-programed elution separating (TREF) section and a gel permeation chromatography (GPC) section, in the component (X), a ratio of a component (X1) with a logarithm log N of 5.6 or more is in a range of 6.0 to 45.0 wt %, with respect to 100 wt % of the total amount of the elution, where M is a molecular weight based on polystyrene, and a gel fraction is in a range of 5.0 to 50 wt %, the chromatography conditions (1) to (3) are:

(1) the TREF section is maintained at 100° C. for 10 min, after an o-dichlorobenzene solution of the thermoplastic elastomer composition is injected in the TREF section, the o-dichlorobenzene solution including the thermoplastic elastomer composition by a concentration of 1 mg/mL;

(2) the temperature in the TREF section is cooled down to −5° C. at a rate of 2.0° C./min, and maintained at −5° C. for 30 min, and thereafter an amount of elution at −5° C. is measured; and (3) the temperature in the TREF section is increased at a rate of 40° C./min to a target temperature, and maintained at the target temperature for 30 min, and thereafter an amount of elution at the target temperature is measured, where the operation (3) is repeated for three target temperatures, 50° C., 100° C., and 140° C.

Gel Fraction

The thermoplastic elastomer composition according to the third invention of the present application has a gel fraction in a range of 5.0 to 50 wt %.

The gel fraction is a fraction of a component insoluble in o-dichlorobenzene at 140° C. and indicates a ratio of a cross-linked component (which is substantially the (A) ethylene rubber, most of which is cross-linked) in the thermoplastic elastomer composition. With a gel fraction in a range of 5.0 to 50 wt %, the ratio of the cross-linked component and a non-cross-linked component becomes appropriate, thereby making it possible to realize an appropriate balance between rubber elasticity and formability for the thermoplastic elastomer composition, and attaining excellent retainability of shibo (embossed patterns) under severe conditions during processing, and excellent sheet outer appearance, especially excellent mattering property.

The gel fraction may be preferably in a range of 10 to 45 wt %, or more preferably in a range of 15 to 30 wt %.

The thermoplastic elastomer composition according to the third invention of the present application preferably includes the (A) ethylene rubber and the (B) propylene polymer.

The gel fraction can be measured by a method usually used in the technical field to which the present disclosure pertains. It is preferable to measure the gel fraction by using gel permeation chromatography (GPC) for the sake of accuracy, and it is preferable to measure the gel fraction according to the following method.

A predetermined amount of the thermoplastic elastomer composition (solid) is placed in a metal mesh bag, and thermally dissolved in a predetermined amount of a dissolving solvent (o-dichlorobenzene) under stirring, thereby preparing a sample solution for the GPC measurement. This leaves in the metal mesh bag the cross-linked component insoluble in the solvent, as a result of which only the component soluble in the solvent will be measured by the GPC measurement. The gel fraction is calculated according to Formula (1) below, where P is a peak area in a GPC chromatogram of the sample solution measured by the GPC using a refractometer and Q is a peak area of GPC chromatogram of a polyethylene control of the same amount measured under the same conditions.

$$\text{Gel Fraction(wt \%)} = 100(Q-P)/Q \tag{1}$$

More specifically, the gel fraction can be more accurately worked out by a method described in Examples of the present application.

The reason why the gel fraction can be worked out is as follows.

This GPC uses a refractometer and therefore the peak areas of the GPC chromatograms are proportional to the sample concentration (amount of the sample). Basically speaking, in a case of hydrocarbons, the same amounts will be detected with the same intensities. Here, the polyethylene control is such that a total amount thereof can be dissolved into the solvent (o-dichlorobenzene), whereas the thermoplastic elastomer composition is such that the insoluble cross-linked compound will not be dissolved in the solvent but left in the metal mesh bag, whereby the solution only containing the soluble component in the solvent will be the sample solution for the GPC.

That is, the sample concentration of the GPC sample solution prepared from the thermoplastic elastomer composition containing the cross-linked component becomes low corresponding to the thermoplastic elastomer composition including the cross-linked component.

The peak area Q of the solution of the polyethylene control is proportional to the total amount of the polyethylene control dissolved therein, while the peak area P of the sample solution of the thermoplastic elastomer composition becomes small corresponding to the thermoplastic elastomer composition including the cross-linked component. Therefore, a difference between P and Q calculated according to Formula (1) corresponds to the amount of the cross-linked component contained in the thermoplastic elastomer composition.

The gel fraction can be adjusted as appropriate by adjusting the content and/or molecular weight of the (A) ethylene rubber, the content of monomer unit derived from the at least one selected from the group consisting of propylene and C4 to C15 α-olefins in the (A) ethylene rubber, the content of the monomer unit derived from non-conjugate diene in the (A) ethylene rubber, and/or by adjusting the amounts of the (D) cross-linking agent and the cross-linking aid and/or crosslinking conditions.

The gel fraction can be greater by increasing the content of the (A) ethylene rubber.

The gel fraction can be greater by increasing the content of the non-conjugate diene in the (A) ethylene rubber.

The gel fraction can be greater by increasing the amount of the (D) cross-linking agent or the cross-linking aid.

In order to attain the gel fraction of the thermoplastic elastomer composition in a range of 5.0 to 50 wt %, the content of the (A) ethylene rubber in the thermoplastic elastomer composition may be preferably in a range of 26 to 70 wt %, or more preferably in a range of 36 to 55 wt %, where the total amount of the thermoplastic elastomer composition is 100 wt %.

In order to attain the gel fraction of the thermoplastic elastomer composition in a range of 5.0 to 50 wt %, the content of the monomer unit derived from the non-conjugate diene in the (A) ethylene rubber in the thermoplastic elastomer composition may be preferably in a range of 1 to 30 wt %, more preferably in a range of 2 to 20 wt %, or further preferably in a range of 3 to 15 wt %, where the total amount of the thermoplastic elastomer composition is 100 wt %.

In order to attain the gel fraction of the thermoplastic elastomer composition in a range of 5.0 to 50 wt %, the amount of the (D) cross-linking agent in producing the thermoplastic elastomer composition may be preferably in a range of 0.01 to 3.0 wt %, more preferably in a range of 0.05 to 2 wt %, or further preferably in a range of 0.1 to 1 wt %, where the total amount of the ethylene rubber is 100 wt %.

Component (X) Eluting at an Elution Temperature in a Range of 100° C. to 140° C.

A ratio of a component (X) in the thermoplastic elastomer composition according to the third invention of the present application, where the component (X) elutes at an elution temperature in a range of 100° C. to 140° C. is generally in a range of 1 to 50 wt %, preferably in a range of 10 to 45 wt %, or more preferably in a range of 15 to 40 wt %, where a total amount of elution is 100 wt %.

By attaining the ratio of the component (X) within the ranges as well as the other conditions specified in the third invention of the present application, the thermoplastic elastomer composition according to the third invention of the present application is facilitated to attain an excellent formability, an excellent retainability of shibo (embossed patterns) in such a wide temperature range ranging from low temperatures to high temperatures, and an excellent sheet outer appearance.

The ratio of the component (X) can be adjusted as appropriate by adjusting the content and/or molecular weight of the non-cross-linked resin component such as the (B) propylene polymer, the content of the monomer unit derived from propylene, and/or the like.

The ratio of the component (X) can be greater by increasing the content of the (B) propylene polymer.

In order to attain the ratio of the component (X) in a range of 1 to 50 wt %, the content of the (B) propylene polymer in the thermoplastic elastomer composition may be preferably in a range of 16 to 45 wt %, or more preferably in a range of 26 to 40 wt %.

The ratio of the component (X) can be measured by cross-fractionation chromatography (CFC), and more specifically can be measured by a method described in Examples of the present application.

The CFC measurement may be carried out preferably with a sample solution prepared by placing a sample (solid) of the thermoplastic elastomer composition in a metal mesh bag, and thermally dissolving the sample in a solvent (o-dichlorobenzene) under stirring. This leaves the cross-linked component insoluble in the solvent in the metal mesh bag, whereby the component soluble in the solvent alone will be subjected to the CFC measurement. Thus, the ratio of the component (X) can be worked out on the basis of the total amount of elution (100 wt %).

Component (X1) with a logarithm log M of 5.6 or more where the logarithm log M is a logarithm of the molecular weight M based on polystyrene A ratio of a component (X1) with a logarithm log M of 5.6 or more where the logarithm log M is a logarithm of the molecular weight M based on polystyrene is in a range of 6.0 to 45.0 wt %, preferably in a range of 7.0 to 40.0 wt %, more preferably in a range of 8.0 to 35.0 wt %, or further preferably in a range of 9.0 to 30.0 wt %, with respect to 100 wt % of the total amount of elution. By attaining the ratio of the component (X1) within the ranges as well as the other conditions specified in the third invention of the present application, the thermoplastic elastomer composition according to the third invention of the present application is facilitated to attain an excellent formability, an excellent retainability of shibo (embossed patterns) in a severe high temperature range, and an excellent sheet outer appearance.

In order to attain the ratio of the component (X1) in the range of 6.0 to 45.0 wt %, the thermoplastic elastomer composition may be preferably produced by a production method including the step 1' and the step 2' described above.

Preferable aspects of the (A) ethylene rubber, the (B1) propylene polymer, the (B2) propylene polymer with a melt flow rate in a range of 0.3 to 2 g/10 min, and the (D) cross-linking agent used in the step 1' and the step 2' are similar to those described above. The ratio of the component (X1) can be greater by increasing the amount of the (B2) propylene polymer used in the step 2' with a melt flow rate in a range of 0.3 to 2 g/10 min. In order to attain the ratio of the component (X1) in a range of 6.0 to 45.0 wt %, it is preferable that the (B2) propylene polymer with a melt flow rate in a range of 0.3 to 2 g/10 min be the propylene homopolymer and/or the propylene polymer material and be included by 7 to 15 wt %, where the total amount of the thermoplastic elastomer composition is 100 wt %.

Component (X2) with a logarithm log M of 4.6 or less where the logarithm log M is a logarithm of the molecular weight M based on polystyrene A ratio of a component (X2) with a logarithm log M of 4.6 or less where the logarithm log M is a logarithm of the molecular weight M based on polystyrene is preferably 10.0 wt % or less, more preferably in a range of 0.1 to 5.0 wt %, or further preferably in a range of 0.1 to 2.5 wt %, with respect to 100 wt % of the total amount of elution. With the component (X2) within the ranges, the thermoplastic elastomer composition according to the present embodiment is facilitated to attain an excellent formability, an excellent retainability of shibo (embossed patterns), and an excellent sheet outer appearance.

In order to attain the component (X2) of 10.0 wt % or less, the thermoplastic elastomer composition may be preferably produced by a production method including the step 1' and the step 2' described above. By reducing the amount of the (B1) propylene polymer used in the step 1', the ratio of the component (X2) can be reduced. In order to attain the component (X2) of 10.0 wt % or less, it is preferable that the amount of the (B1) propylene polymer used be in a range of 15 to 20 wt %, where the total amount of the thermoplastic elastomer composition is 100 wt %.

Component (α) Eluting at an Elution Temperature of −5° C.

A ratio of a component (α) eluting at an elution temperature of −5° C. is preferably 70.0 wt % or less, more preferably in a range of 20 to 65 wt %, or further preferably in a range of 30 to 60 wt %, with respect to 100 wt % of the total amount of elution. With the component (α) within the ranges, the thermoplastic elastomer composition according to the present embodiment is facilitated to attain an excellent formability, an excellent retainability of shibo (embossed patterns), and an excellent sheet outer appearance.

The ratio of the compound (α) can be adjusted as appropriate by adjusting the ratios of the (A) ethylene rubber, the (E) mineral oil, and/or the like, or by adjusting the amounts of the (D) cross-linking agent and cross-linking aid, and/or the cross-linking conditions.

The ratio of the component (α) can be greater by increasing the ratio of the (E) mineral oil.

In order to attain a ratio of the compound (α) of 70 wt % or less, the content of the (e) mineral oil in the thermoplastic elastomer composition may be preferably in a range of 1 to 60 wt %, more preferably in a range of 10 to 50 wt %, or further preferably in a range of 15 to 45 wt %.

It is deduced that the component (α) is derived from the (E) mineral oil and the component in the (A) ethylene rubber whose ethylene content is small and which is small in molecular weight and not cross-linked.

The ratio of the component (α) can be measured by cross-fractionation chromatography (CFC), and more specifically can be measured by a method described in Examples of the present application.

Note that the component (α) includes all components eluting at −5° C., which is the lowest temperature for the measurement, and therefore include components eluting at temperatures lower than −5° C.

Component (β) Eluting at an Elution Temperature of −5° C. to 50° C.

A ratio of a component (β) eluting at an elution temperature of −5° C. to 50° C. is preferably in a range of 1 to 39 wt %, more preferably in a range of 3 to 20 wt %, or further preferably in a range of 5 to 14 wt %, with respect to 100 wt % of the total amount of elution. With the component (β) within the ranges, the thermoplastic elastomer composition according to the present embodiment does not include too much none-cross-linked (A) ethylene rubber or the like and so is facilitated to attain an excellent retainability of shibo (embossed patterns), and an excellent sheet outer appearance.

The ratio of the component (β) can be adjusted as appropriate by adjusting the amount of the (A) ethylene rubber, adjusting the molecular weight of the (C) ethylene polymer including, by 90 wt % or more, the monomer unit derived from ethylene, the content of the monomer unit derived from ethylene, the density, and/or the like, or adjusting the amount of the (D) cross-linking agent and the cross-linking aid, and the cross-linking conditions.

The ratio of the component (β) can be greater by increasing the ratio of the (A) ethylene rubber.

The ratio of the component (β) can be greater by reducing the amounts of the (D) cross-linking agent and the cross-linking aid.

In order to attain the ratio of the component (β) in a range of 1 to 39 wt %, the content of the (D) cross-linking agent in the thermoplastic elastomer composition may be in a range of 0.01 to 3.0 wt %, more preferably in a range of 0.05 to 2 wt %, or further preferably in a range of 0.1 to 1 wt %, where the thermoplastic elastomer composition is 100 wt %.

It is deduced that the component (β) is derived from the non-cross-linked (A) ethylene rubber, the ethylene copolymer portion (II) of a low molecular weight in the (B) propylene polymer being the propylene polymer material, and the like.

The ratio of the component (β) can be measured by cross-fractionation chromatography (CFC), and more specifically can be measured by a method described in Examples of the present application.

Component (γ) Eluting at an Elution Temperature in a Range of 50° C. to 100° C.

A ratio of a component (γ) eluting at an elution temperature in a range of 50° C. to 100° C. is preferably in a range of 0.1 to 39 wt %, more preferably in a range of 5 to 30 wt %, or further preferably in a range of 8 to 25 wt %, with respect to 100 wt % of the total amount of elution. With the component (γ) within the ranges, the thermoplastic elastomer composition according to the present embodiment is facilitated to attain an excellent formability, an excellent retainability in a low temperature of shibo (embossed patterns), and an excellent sheet outer appearance.

The ratio of the component (γ) can be adjusted as appropriate by adjusting the amount and the molecular weight of the (B) propylene polymer, and the content of the monomer unit derived from propylene, and/or adjusting the content of the (C) ethylene polymer including, by 90 wt % or more, the monomer unit derived from ethylene.

The ratio of the component (γ) can be greater by increasing the molecular weight of the (C) ethylene polymer including, by 90 wt % or more, the monomer unit derived from ethylene.

It is deduced that the component (γ) is derived from the (B) propylene polymer of a low molecular weight, the ethylene copolymer portion (II) in the (B) propylene polymer being the propylene polymer material, the (C) ethylene polymer including, by 90 wt % or more, the monomer unit derived from ethylene, and the like.

The ratio of the component (γ) can be measured by cross-fractionation chromatography (CFC), and more specifically can be measured by a method described in Examples of the present application.

Materials constituting the thermoplastic elastomer composition according to the third invention of the present application are not particularly limited but may use part or all of the materials constituting the thermoplastic elastomer composition according to the first invention of the present application.

Depending on usages or properties desired, it is preferable that the thermoplastic elastomer composition according to the third invention of the present application have all or part of features and/or preferable technical features of the thermoplastic elastomer composition according to the first invention of the present application.

The thermoplastic elastomer composition according to the third invention of the present application is not particularly limited in terms of its shape when used, and may be processed or shaped into a desired shape as appropriate for usages or the like, and may be for example shaped into a sheet-like shape. Such a sheet containing the thermoplastic elastomer composition according to the third invention of the present application may be a sheet according to a second invention of the present application described above. Depending on usages or properties desired, it is preferable that the sheet containing the thermoplastic elastomer composition according to the third invention of the present application have all or part of features and/or preferable technical features of the sheet according to the second invention of the present application.

Usages

The thermoplastic elastomer compositions according to the first and third inventions of the present application, and the sheet according to the second invention of the present application are applicable to various usages, and are especially suitable for usages that require high levels of formability and outer appearance of the formed products. Such thermoplastic elastomers and sheet are applicable to, for example, automobile parts, sports goods, leisure goods, household utensils, electric and electronic devices, building interior and exterior materials, and the like, and especially suitably applicable to skin materials for automobile interiors such as door trims and instrument panels, especially skin materials with patterns such as shibo or embossed patterns on its surface.

EXAMPLES

In the following, the present disclosure will be described in more detail, referring to Examples and Comparative Examples. It should be noted that the technical scope of the present disclosure is not limited to these Examples by any means.

Evaluation of properties in Examples and Comparative Examples were carried out as follows.

(1) Melt Flow Rate (MFR, Unit: g/10 min)

An MFR of ethylene the (C) ethylene polymer including, by 90 wt % or more, the monomer unit derived from ethylene was measured at a temperature of 190° C. under a load of 21.18N by the method B according to JIS K7210.

An MFR of the (B) propylene polymer was measured at a temperature of 230° C. under a load of 21.18N by the method B according to JIS K7210.

An MFR of the thermoplastic elastomer composition was measured at a temperature of 230° C. under a load of 98.07N by the method B according to JIS K7210.

(2) Mooney Viscosity ($ML_{1+4}$ 100° C.)

A Mooney viscosity of the ethylene rubber was measured at 100° C. based on JIS K6300.

(3) Contents of the Monomer Unit Derived From Ethylene, the Monomer Unit Derived From Propylene, and the Monomer Unit Derived From 5-ethylidene-2-norbornene in the (A) Ethylene Rubber (Unit: wt %)

The contents of the monomer unit derived from ethylene, the monomer unit derived from propylene, and the monomer unit derived from 5-ethylidene-2-norbornene in the (A) ethylene rubber were measured by the infrared spectroscopy. More specifically, an ethylene-propylene-5-ethylidene-2-norbornene copolymer was molded into a film of about 0.5 mm in thickness, and the film was measured by an infrared spectrometer as to a peak intensity of a peak (absorption peak at 1688 $cm^{-1}$) derived from 5-ethylidene-2-norbornene in the film, and the content of the monomer unit derived from 5-ethylidene-2-norbornene in the (A) ethylene rubber was worked out. Next, the ethylene-propylene-5-ethylidene-2-norbornene copolymer was newly molded into a film of about 0.1 mm in thickness, and the infrared absorption spectrum of the film was measured by using the infrared spectrometer, the content of the monomer unit derived from ethylene and the content of the monomer unit derived from propylene were worked out according to the method described in the literature ("characterization of polyethylene by infrared absorption spectra (*Sekigai Kyushu Supekutoru niyoru polyethylene no characterization*) (written by Takayama, Usamai, et al.)" or in "Die Makromolekulare Chemie, 177, 461 (1976) (written by McRae, M. A., MadamS, W. F. et al.)."

(4) Contents of the Monomer Unit Derived From Ethylene and the Monomer Unit Derived From at Least One Selected From the Group Consisting of Propylene and C4 to C10 α-olefins in the Polymers (Unit: wt %)

The contents of the monomer unit derived from ethylene and the monomer unit derived from at least one selected from the group consisting of propylene and C4 to C10 α-olefins in the polymers are measured from infrared absorption spectra (manufactured by JASCO corporation, FT-IR5200) according to the method stipulated in ASTM D 3900.

(5) Specific Viscosity ([ηcxs], [ηcxis]) (Unit: dl/g)

By using an Ubbelohde type viscometer, a reduced viscosity was measured in tetralin at 135° C. and specific viscosity was worked out by extrapolation according to the calculation method described on Page 491 of "Polymer Solution, Polymer Experiment Study 11 (Kobunshi Yoeki, Kobunshi Jikkengaku 11)" (1982, published by KYORITSU SHUPPAN CO., LTD.).

In Examples, for the heterophasic propylene polymer materials, specific viscosity of the component insoluble in xylene at 20° C. [ηcxis] was considered as the specific viscosity of the propylene homopolymer component contained in the heterophasic propylene polymer material ([ηA]), and the component soluble in xylene at 20° C. [ηcxs] was considered as specific viscosity of the ethylene-propylene copolymer component contained in the heterophasic propylene polymer material ([ηB]).

(6) Separation of the CXIS Component and CXS Component

After about 5 g of a sample was completely dissolved in 500 ml of boiled xylene, a xylene solution thus prepared was gradually cooled down to room temperature, and maintained at 20° C. for 4 hours or longer, thereby separating precipitates and the solution. The precipitates were considered as the CXIS component and a component obtained by removing the solvent from the solution was considered as the CXS component.

(7) Density (Unit: $g/cm^3$)

Density was measured according to the method stipulated in JIS K7112, without annealing.

(8) Production Method of Pressed Sheet

By using press molding device F-37 manufactured by Shinto Metal Industries, Ltd., thermoplastic elastomer compositions were subjected to hot press molding for 5 min at a temperature of 200° C. with a maximum pressure of 10 MPa, and then subjected to cold press molding for 5 min at a temperature of 23° C. with a maximum pressure of 10 MPa, thereby preparing a pressed sheet (length 50 mm, width 50 mm, thickness 0.50 mm).

(9) Production Method of Extruded Sheet

By using a USV-type 25 mm Φ extruder (with a T-die of 100 mm in width) manufacture by Union Plastic Co., Ltd, thermoplastic elastomer compositions of Examples and Comparative Examples were extruded via the T-die with a cylinder temperature of 220° C., a full-flighted screw, and a screw rotation speed of 40 rpm. A melted film thus extruded was air-cooled along a metal roll, thereby molding the film into an extruded sheet (about 95 mm in width and 1.0 mm in thickness).

Moreover, for use in gloss measurement, an extruded sheet was prepared under the above conditions, except that a raw material was a mixture prepared by pellet-blending 1 part by weight of a black pigment master batch (manufactured by Sumika Color Co., Ltd., Product Name "PEM 8020") described later into 100 parts by weight of a thermoplastic elastomer composition.

(10) Outer Appearance of Extruded Sheet

By using a USV-type 25 mmΦ extruder manufacture by Union Plastic Co., Ltd., an extruded sheet of 0.2 mm in thickness was prepared by extrusion with a cylinder temperature of 220° C., a full-flighted type screw, and a screw rotation speed of 20 rpm. Small agglomerations of 0.5 mm or greater in diameter present in the extruded sheet are judged as irregularities, and the outer appearance of the extruded sheet was visually evaluated by the number of irregularities observed in an arbitrary selected region of 40 cm in length and 80 mm in width. When a sheet skin of the extruded sheet was good and the number of irregularities was 10 or less, the extruded sheet was judged as "Good." When the sheet skin had a slight roughness surface and the number of irregularities was more than 10 but not more than 20, the extruded sheet was judged as "moderate". When the sheet skin was poor and the number of irregularities was more than 20, the extruded sheet was judged as "poor."

(11) Gel Fraction

The gel fraction is a ratio of the component insoluble in o-dichlorobenzene at 140° C., and measured by GPC. The GPC measurement and the gel fraction calculation were carried out as follows.

(GPC Measurement Conditions)

GPC Device: HLC-8321GPC/HT (manufactured by Tosoh Corporation)

GPC Column: Tosoh TSKgel GMH$_{HR}$-H(S)HT2 7.8 mm I.D.×300 mm (manufactured by Tosoh Corporation): three columns Mobile Phase: prepared by adding an antioxidant in o-dichlorobenzene (manufactured by FUJIFILM Wako Pure Chemical Corporation, special grade) by 0.1 w/V %, where the antioxidant for down-regulating decomposition of the polymer was 2,6-di-t-butyl-4-methylphenol (BHT) (manufactured by FUJIFILM Wako Pure Chemical Corporation, special grade, purity 98%).

Flow Rate: 1 ml/min
Column Oven Temperature: 140° C.
Autosampler Temperature: 140° C.
System Oven Temperature: 40° C.
Detection: Differential Refractometer (RID)
RID Cell Temperature: 140° C.
Sample Solution Injection Amount: 300 µl
Dissolving Solvent: same as the mobile phase
Dissolving auto-agitator: DF-8020 (Manufactured by Tosoh Corporation)

Dissolving Procedure: Into a screw vial of 30 ml capacity, 20.0 mg of a thermoplastic elastomer composition and 20.0 ml of the dissolving solvent were introduced and sealed. The screw vial was set on the dissolving auto-agitator, and agitated at 140° C. for 120 min. Then, a solution thus prepared was filtered via a filter with a pore size of 0.8 µm or larger. Here, the filtration was carried out at a temperature of 140° C. or higher for a time period of 20 min or shorter, where the time period was for avoiding a concentration change due to evaporation of the solvent. As a result of these operations, a sample solution for the GPC measurement was prepared.

<Gel Fraction Calculation>

The gel fraction was calculated by the Formula (1) below.

$$\text{Gel Fraction(wt \%)} = 100(Q-P)/Q \quad (1).$$

where P is a peak area obtained by drawing base lines for a peak on a chromatogram obtained by measuring the sample solution with the GPC measurement, whereas Q is a peak area obtained by drawing base lines for a peak on a chromatogram obtained by measuring a polyethylene control NIST1475a with the GPC measurement. The drawing of the baselines was carried out based on the description on ISO16014-1.

(12) Identification of Extracted Component (a Ratio of a Component Dissoluble in a Particular Temperature Range)

Amounts of the components in the samples were measured by the CFC. Into a SUS-made metal mesh bag with 2300 mesh, 20 mg of a sample was placed, and thermally dissolved at 145° C. in 20 ml of o-dichlorobenzene containing 0.05 wt % of BHT for 60 min under stirring, thereby preparing a sample solution of 1.0 mg/ml concentration. The sample solution of 0.5 ml was injected into a TREF column maintained at 145° C. in a CFC device and held for 20 min. Then, a temperature of the TREF column was increased to 100° C. at a rate of 40° C./min, and held at 100° C. for 10 min. After that, the temperature of the TREF column was cooled down to −5° C. at a rate of 2.0° C./min and held at −5° C. for 30 min. Next, the temperature of the TREF column was increased to 50° C. at a rate of 40° C./min and held to 50° C. for about 30 min. Next, the temperature of the TREF column was increased to 100° C. at a rate of 40° C./min and held at 100° C. for about 30 min. Then, the temperature of the TREF column was increased to 140° C. at a rate of 40° C./min and held at 140° C. for about 30 min. After that, an amount of elution at 140° C. was measured by using a GPC (provided in the CFC) with an infrared spectrometer. The ratio (wt %) of the amount of the elution at −5° C. in the total amount of the elution is the component (α). The ratio (wt %) of the amount of the elution at 50° C. in the total amount of the elution is the component (β) (corresponding to the component that elutes in the range of the elution temperature between −5° C. and 50° C.). A ratio (wt %) of the elution at 100° C. in the total amount of the elution is the component (γ) (corresponding to the component that elutes in the range of the elution temperature between 50° C. and 100° C.). A ratio (wt %) of the elution at 140° C. in the total amount of the elution is the component (X) (corresponding to the component that elutes in the range of the elution temperature between 100° C. and 140° C.). Moreover, as a component soluble in o-dichlorobenzene at 140° C., a molecular chain length distribution in the component (X) in the sample was worked out. A ratio (wt %) of a component eluting at 140° C. with LOG M of 5.6 or more (where M is the molecular weight based on polystyrene) in the total amount of the elution is the component (X1). A ratio (wt %) of a component eluting at 140° C. with LOG M of 4.6 or less in the total amount of the elution is the component (X2).

(i) Device: Automated 3D analyzer CFC-2, manufactured by Polymer ChAR (Polymer Characterization, S.A.).

(ii) TREF column: Stainless steel micro ball-filled column (3/8" o.d×150 mm) manufactured by Polymer ChAR.

(iii) Solvent, GPC Mobile Phase: prepared by adding an antioxidant in o-dichlorobenzene (manufactured by FUJIFILM Wako Pure Chemical Corporation, special grade) by 0.05 w/V %, where the antioxidant for down-regulating decomposition of the polymer was 2,6-di-t-butyl-4-methylphenol (BHT) (manufactured by FUJIFILM Wako Pure Chemical Corporation, special grade, purity 98%).

(iv) Sample Solution Concentration: prepared by adding 20 ml of solvent in 20 mg of the sample.

(v) Dissolving of the Sample: thermally dissolving the sample at 145° C. for 60 min under stirring.

(vi) Amount of injection into the TREF column: 0.5 mL (vii) Flow Rate of the GPC Mobile Phase: 1.0 ml/min (viii) GPC Column: Tosoh TSKgel $GMH_{HR}$-H(S)HT2 7.8 mm I.D.×300 mm (manufactured by Tosoh Corporation): three columns (ix) Detector: infrared Spectrometer IR5 manufactured by Polymer ChAR (provided in the CFC device)

(x) Calibration for the GPC column: Combinations of 1 mg of polystyrene controls manufactured by Tosoh Corporation were weighed as listed below, and 20 ml of o-dichlorobenzene was added in each combination (to make up the same composition as the GPC mobile phase), and dissolved at 145° C. for 1 hour, thereby preparing solutions. Each solution was analyzed by GPC analysis and a calibration curve was prepared from relationship between molecular chain length of each polystyrene controls and peak top elution time. The calibration was carried out based on the calibration curve.

Combination 1: F850, F80, F1
Combination 2: F288, F10, A2500
Combination 3: F80, F4, A1000
Combination 4: F40, F2, A500

(13) Sink-In Temperature

By using a thermomechanical analysis apparatus, the sink-in temperature was measured by the method stipulated in JIS K7196 (Testing method for softening temperature of thermoplastics film and sheeting by thermomechanical analysis). From a portion vicinity of the center portion of a pressed sheet prepared in (8), a test piece of 5.0 mm in height, 5.0 mm in length, and 0.50 mm in thickness was cut out, and the sinking-in was measured in the thickness direction. The pressure load used had a column shape of 1.0 mm in diameter at the tip. The sink-in temperature was a temperature when the pressure load sank in by 100 μm under application of a force of 780 mN thereon.

(i) Device: TMA/SS6200 (manufactured by Hitachi High-Tech Science Corporation)

(ii) Pressure Load: 1 mm in diameter (iii) Atmosphere: Nitrogen, 100 ml per min (iv) Temperature Program: Temperature was increased from 30° C. to 190° C. at a rate of 5° C./min (v) Load: 780 mN (vi) Measuring Method for Sink-in Temperature: On set of a sinking-in of the pressure load into the sample was considered as a softening point. The temperature when the sinking-in was 100 μm was taken as the sink-in temperature.

(14) Matting Property

Based on JIS K-7105 (1981), a gloss value of the extruded sheet prepared by the method described in (9) was measured at an incident angel and light-receiving angle of 60° by using a digital gloss meter for variable angles (model: UGV-5DP) manufactured by Suga Test Instruments Co., Ltd. The matting property is better when the gloss value is smaller.

(15) Production Method for Extruded Sheet for Vacuum Molding

Using a sheet producing device S550-V4 manufactured by Tanabe Plastics Machinery Co., Ltd. (with 40 mm Φ extruder, L/D=26, Dulmadge type screw, Coat-Hanger Die), an extruded sheet T of about 450 mm in width and 0.5 mm in thickness was prepared from a thermoplastic elastomer composition with a die temperature of 190° C., a screw rotation speed of 33 rpm, a reeling speed of 0.4 m/min. Note that the extruded sheet T was prepared from a raw material prepared by pellet-blending 1 part by weight of a black pigment master batch (manufactured by Sumika Color Co., Ltd., Product Name "PEM 8020") described later into 100 parts by weight of the thermoplastic elastomer compositions of Examples and Comparative Examples.

The extruded sheet T thus obtained was subjected to an embossing rolls to create a geometric pattern (chess board-like pattern with a symbol size of 4.0 mm in length, 4.0 mm in width, and 300 μm in depth) thereon, thereby preparing the extruded sheet T with embossing (shibo).

(16) Vacuum Molding

Using a vacuum molding device TF-16-VP manufactured by Nakakura Kihan Co., Ltd., vacuum molding was carried out.

To begin with, the extruded sheet T with embossing prepared by the method in (15) was held with a cramp. Then, the extruded sheet T with embossing was heated until a surface temperature thereof reached 150° C., and was subjected to vacuum molding by using a box-shaped male mold (a quadrangular prism-shaped mold for vacuum molding with a protrusion with a bottom surface of 145 mm×140 mm, an upper surface of 90 mm×90 mm, and height of 55 mm).

(17) Retainability of Embossing

In the present application, the retainability of embossing was carried cut by two methods as follows.

(17-1) Quantitative Evaluation

Retainability percentage of embossing of a molded product obtained in the above (16) was worked out by measuring an amount of a change in embossing height by using an optical microscope. Observation with the optical microscope and calculation of the amount of the change in embossing height were carried out as follows.

(i) Optical Microscopy Observation Conditions

Microscopy: Digital Microscope RH2000 (HiRox)

Program used: Hirox RH2000

Measurement Mode: 3D auto-tiling

Magnification: 200 times

Image Processing: Smoothing with tilting correction

Cut-off value: 25 μm (using roughness curve) Observation Procedure: An image of 80 mm×80 mm was obtained with the 3D auto tiling mode in such a way that the image of 80 mm×80 mm covered a place with a worst retainability of embossing judged by visual observation. From the image thus obtained, an average height was obtained by using the program. For each of horizontal and vertical directions of the image, five lines were selected and heights of protruded parts and recessed parts in the embossing were measured and height differences were averaged.

(ii) Calculation of the Amount of Change in Height of Embossing

The amount of the change in height of embossing was calculated out according to the following Formula (2).

$$\text{Retainability of Embossing} = h/H \times 100 \qquad (2)$$

where H is the average of height differences between the protrusion parts and recessed parts in the embossing before the vacuum molding, and h is the average of height differences between the protrusion parts and recessed parts in the embossing after the vacuum molding (17-2) Qualitative Evaluation by Visual Observation The molded product produced in (16) was visually evaluated in terms of the retainability of embossing and rated by 5-grade evaluation.

5: The embossing hardly disappeared.
4: The embossing slightly disappeared.
3: The embossing significantly disappeared.
2: The embossing almost completely disappeared.
1: The embossing completely disappeared.

Starting materials used in Examples were as follows. Note that these materials may be only indicated by abbreviations on Tables and the like.

Oil-Extended Ethylene Rubber (a Composition Including the (A) Ethylene Rubber and the (E) Mineral Oil)

(A-1) 100 Parts by Weight of ethylene-propylene-5-ethylidene-2-norbornene Copolymer Mixed with 40 Parts by Weight of (E-1) Paraffin Mineral Oil (Manufactured by Idemitsu Kosan Co., Ltd., Product Name "PW-380")

Mooney viscosity ($ML_{1+4}$ 100° C.) of (A-1)+(E-1)=79, The content of the monomer unit derived from ethylene in (A-1)=67.9 wt %, The content of the monomer unit derived from propylene in (A-1)=27.8 wt %, The content of the monomer unit derived from 5-ethylidene-2-norbornene in (A-1)=4.3 wt %, Density: 0.884 g/cm$^3$ (B): Propylene Polymer (B-1) Propylene Homopolymer MFR (230° C., 21.18N)=0.5 g/10 min, [ηcxis]=3.0 dl/g (B-2) Propylene Homopolymer MFR (230° C., 21.18N)=20 g/10 min, [ηcxis]=1.3 dl/g (B-3) Propylene Random Copolymer MFR (230° C., 21.18N)=1.5 g/10 min, the content of the monomer unit derived from ethylene=5 wt %, [ηcxs]=0.88 dl/g, [ηcxis]=2.24 dl/g (B-4) Propylene Polymer Material MFR (230° C., 21.18N)=3 g/10 min, the content of the ethylene-propylene copolymer component=20 wt %, the content of the monomer unit derived from ethylene in the ethylene-propylene copolymer component=37 wt %, [ηcxs]= 3.80 dl/g, [ηcxis]=1.79 dl/g (B-5) Propylene Polymer Material MFR (230° C., 21.18N)=0.5 g/10 min, the content of the ethylene-propylene copolymer component=16 wt %, the content of the monomer unit derived from ethylene in the ethylene-propylene copolymer component=40 wt %, [ηcxs]= 3.20 dl/g, [ηcxis]=2.77 dl/g (C): Ethylene Polymer Including, by 90 wt % or More, the Monomer Unit Derived From Ethylene (C-1) Product Name "Sumikathene G201" Manufacture by Sumitomo Chemical Co., Ltd. (Low-Density Polyethylene) MFR (190° C., 21.18N)=2 g/10 min, Density: 0.919 g/cm$^3$ Composition Including (D) Cross-Linking Agent and (E) Mineral Oil (D-1+E-2) A Composition Including 10 wt % of (D-1) Production Name "APO-10DL" Manufactured by Kayaku Akzo Co., Ltd.

(2,5-dimethyl-2,5-di(tert-butylperoxy)hexane and 90 wt % of (E-2) paraffine mineral oil (manufactured by Idemitsu Kosan Co., Ltd., Product Name "PW-100"), where the total amount of (D-1) and (E-2) was 100 wt %.

Others

Anti-oxidant: Product Name "Irganox 1010" manufactured by BASF Japan.

Cross-linking agent: Product Name "Hi-Cross M-P" manufactured by Seiko Chemical Co., Ltd. (66.7% dilution of trimethylol propane trimethacrylate with silicon oxide Black pigment master batch: Product Name "PEN 8020" manufactured by Sumika Color Co., Ltd., In Examples and Comparative Examples below, the thermoplastic elastomer compositions were produced by extruding the materials at 200° C.+/−20° C. for 40 seconds+/−20 seconds by using a twin-screw extruder (TEX-44HCT, manufactured by Japan Steel Works, Ltd.).

Example 1

A thermoplastic elastomer composition precursor was produced by extruding a mixture of 62.6 wt % of the oil-extended ethylene rubber ((A-1) 44.7 wt %+(E-1) 17.9 wt %), 26.8 wt % of the (B-4) propylene polymer, 0.1 wt % of the anti-oxidant (Irganox 1010), 0.4 wt % of the cross-linking aid (Hi-cross M-P), and 2.1 wt % of the cross-linking agent ((D-1)+(E-2)). The thermoplastic elastomer composition precursor thus obtained and 8.0 wt % of the (B-1) propylene polymer were mixed and extruded according to the conditions mentioned above, thereby preparing a thermoplastic elastomer composition.

The gel fraction of the thermoplastic elastomer composition was 30.3 wt %. The component (X) in the thermoplastic elastomer composition was 35.0 wt %, and the ratio of the component (X1) was 10.2 wt %.

The thermoplastic elastomer composition thus obtained was press-molded according the method in the above (8). The sink-in temperature of a pressed sheet thus obtained was 128° C.

The thermoplastic elastomer composition thus obtained was extrusion-molded by the method in (9), thereby obtaining an extruded sheet, whose evaluation results are shown on table 1.

Examples 2 to 5

Thermoplastic elastomer compositions were produced and evaluated in terms of their properties as in Example 1, except that the kinds and/or amounts of starting materials to be used were changed as shown on Table 1.

Results of the evaluations are shown on Table 1.

TABLE 1

|  |  |  | Example 1 | Example 2 | Example 3 | Example 4 | Example 5 | Example 6 |
|---|---|---|---|---|---|---|---|---|
| Step 1 | (A) oil-extended ethylene rubber | (wt %) | 62.6 | 62.0 | 59.3 | 62.8 | 50.8 | 59.3 |
|  | A-1 |  | 44.7 | 44.3 | 42.4 | 44.9 | 36.3 | 42.4 |
|  | E-1 |  | 17.9 | 17.7 | 16.9 | 17.9 | 14.5 | 16.9 |
|  | (B) propylene polymer |  | 26.8 | 26.5 | 25.4 | 22.1 | 21.7 | 25.4 |
|  | B-4 | (wt %) | 26.8 | 26.5 | 25.4 |  | 21.7 | 25.4 |
|  | B-2 | (wt %) |  |  |  | 22.1 |  |  |
|  | Irganox 1010 | (wt %) | 0.1 | 0.1 | 0.1 | 0.1 | 0.1 | 0.1 |
|  | Hi-Cross M-P | (wt %) | 0.4 | 0.4 | 0.4 | 0.2 | 0.3 | 0.4 |
|  | D-1 + E-2 | (wt %) | 2.1 | 2.1 | 2.1 | 2.1 | 1.6 | 2.1 |
| Step 2 | B-1 | (wt %) | 8.0 | 8.9 | 12.7 | 12.7 | 10.9 |  |
|  | B-3 | (wt %) |  |  |  |  |  |  |
|  | B-5 | (wt %) |  |  |  |  | 7.3 |  |
|  | C-1 | (wt %) |  |  |  |  |  | 12.7 |
| Gel fraction |  | (wt %) | 30.3 | 28.7 | 27.7 | 36.0 | 22.8 | 25.1 |
| Component (α) eluting at −5° C. |  | (wt %) | 46.2 | 46.1 | 43.6 | 42.8 | 35.6 | 46.0 |
| Component (β) eluting in the range of the elution temperature between −5° C. and 50° C. | (wt %) | 10.0 | 10.2 | 9.6 | 7.6 | 9.3 | 10.5 |

TABLE 1-continued

|  |  | Example 1 | Example 2 | Example 3 | Example 4 | Example 5 | Example 6 |
|---|---|---|---|---|---|---|---|
| Component (γ) eluting in the range of the elution temperature between 50° C. and 100° C. | (wt %) | 8.9 | 9.0 | 9.0 | 9.3 | 22.7 | 8.5 |
| Component (X) eluting in the range of the elution temperature between 100° C. and 140° C. | (wt %) | 35.0 | 34.8 | 37.8 | 40.3 | 32.5 | 35.0 |
| (X1) LOG M ≥ 5.6 | (wt %) | 10.2 | 10.4 | 13.1 | 12.1 | 12.1 | 10.2 |
| (X2) LOG M ≤ 4.6 | (wt %) | 1.3 | 1.4 | 1.3 | 1.9 | 0.9 | 1.5 |
| Sink-in temperature | (° C.) | 128 | 129 | 132 | 137 | 125 | 130 |
| Retainability of Embossing (150° C.) Visual Evaluation | — | 4 | 4 | 5 | 4 | 5 | 5 |
| Retainability of Embossing (150° C.) Retainability ratio | % | 62 | 65 | 74 | 61 | 71 | 70 |
| Matting Property |  | 3.6 | 4.1 | 3.8 | 3.3 | 6.9 | 5.9 |
| Outer Appearance of Extruded Sheet | — | Good | Good | Good | Good | Good | Good |
| Irregularities | Count | 8 | 4 | 3 | 10 | 4 | 8 |
| MFR (230° C., 98N) | g/10 min | 23 | 24 | 26 | 39 | 22 | 22 |

Comparative Example 1

Thermoplastic elastomer compositions were produced and evaluated in terms of their properties as in Example 1, except that the kinds and/or amounts of starting materials to be used were changed as shown on Table 2.

The sink-in temperature of 111° C. was out of the scope of the first invention of the present application, and the ratio of component (X1) of 5.9 wt % was out of the scope of the third invention of the present application.

Results are shown on Table 2.

Comparative Example 2

Thermoplastic elastomer compositions were produced and evaluated in terms of their properties as in Example 1, except that the kinds and/or amounts of starting materials to be used were changed as shown on Table 2.

The sink-in temperature of 111° C. was out of the scope of the first invention of the present application, and the ratio of component (X1) of 5.6 wt % was out of the scope of the third invention of the present application.

Results are shown on Table 2

Comparative Example 3

Thermoplastic elastomer compositions were produced and evaluated in terms of their properties as in Example 1, except that the kinds and/or amounts of starting materials to be used were changed as shown on Table 2.

The sink-in temperature of 108° C. was out of the scope of the first invention of the present application, and the gel fraction of 4.7 wt % was out of the scope of the third invention of the present application.

Results are shown on Table 2.

Comparative Example 4

A thermoplastic elastomer composition was produced and evaluated in terms of their properties as in Example 1, except that the kinds and/or amounts of starting materials to be used were changed as shown on Table 2, and the mixing and extrusion with the (B1) propylene polymer were not performed.

The sink-in temperature of 92° C. was out of the scope of the first invention of the present application, and the ratio of component (X1) of 3.3 wt % was out of the scope of the third invention of the present application.

Results are shown on Table 2.

TABLE 2

|  |  |  | Comparative Example 1 | Comparative Example 2 | Comparative Example 3 | Comparative Example 4 |
|---|---|---|---|---|---|---|
| Step 1 | (A) oil-extended ethylene rubber | (wt %) | 64.9 | 62.0 | 63.2 | 68.1 |
|  | A-1 |  | 46.4 | 44.3 | 45.1 | 48.6 |
|  | E-1 |  | 18.5 | 17.7 | 18.1 | 19.5 |
|  | (B) propylene polymer |  | 27.8 | 26.5 | 27.1 | 29.3 |
|  | B-4 | (wt %) | 27.8 | 26.5 | 27.1 | 29.3 |
|  | B-2 | (wt %) |  |  |  |  |
|  | Irganox 1010 | (wt %) | 0.1 | 0.1 | 0.1 | 0.1 |
|  | Hi-Cross M-P | (wt %) | 0.4 | 0.4 | 0.2 | 0.4 |
|  | D-1 + E-2 | (wt %) | 2.1 | 2.1 | 0.4 | 2.1 |
| Step 2 | B-1 | (wt %) | 4.7 |  | 9.0 |  |
|  | B-3 | (wt %) |  | 8.9 |  |  |
|  | B-5 | (wt %) |  |  |  |  |
|  | C-1 | (wt %) |  |  |  |  |
| Gel fraction |  | (wt %) | 29.3 | 27.8 | 4.7 | 32.9 |
| Component (α) eluting at −5° C. |  | (wt %) | 55.7 | 47.7 | 53.0 | 56.6 |
| Component (β) eluting in the range of the elution temperature between −5° C. and 50° C. |  | (wt %) | 10.0 | 10.4 | 14.1 | 10.7 |
| Component (γ) eluting in the range of the elution temperature between 50° C. and 100° C. |  | (wt %) | 8.2 | 15.3 | 7.9 | 8.8 |
| Component (X) eluting in the range of the elution temperature between 100° C. and 140° C. |  | (wt %) | 26.1 | 26.6 | 25.0 | 24.0 |
| (X1) LOG M ≥ 5.6 |  | (wt %) | 5.9 | 5.6 | 8.9 | 3.3 |
| (X2) LOG M ≤ 4.6 |  | (wt %) | 1.2 | 1.2 | 0.7 | 1.4 |
| Sink-in temperature |  | (° C.) | 111 | 111 | 108 | 92 |

TABLE 2-continued

|  |  |  | Comparative Example 1 | Comparative Example 2 | Comparative Example 3 | Comparative Example 4 |
|---|---|---|---|---|---|---|
| Retainability of Embossing (150° C.) | Visual Evaluation | — | 3 | 3 | 3 | 2 |
| Retainability of Embossing (150° C.) | Retainability ratio | % | 44 | 42 | 56 | 38 |
| Matting Property |  |  | 2.7 | 2.7 | 10.2 | 1.5 |
| Outer Appearance of Extruded Sheet |  | — | moderate | moderate | poor | moderate |
| Irregularities |  | Count | 11 | 15 | 25 | 13 |
| MFR (230° C., 98N) |  | g/10 min | 22 | 25 | 17 | 13 |

The thermoplastic elastomer composition according to the present disclosure is excellent in formability and outer appearance of produced molded therefrom, and is capable of maintaining a given surface pattern, surface shape and the like such as embossing (shibo) even after subjected to processing at relatively severe conditions such as vacuum molding. Thus, the thermoplastic elastomer composition according to the present disclosure is suitably applicable to skin materials for automobile interiors and the like such as door trims and instrument panels. The thermoplastic elastomer composition according to the present disclosure may be highly applicable to various industrial fields such as transportation equipment industry, sports and leisure goods industries, household utensil industry, electric and electronic equipment industries, and building industry.

What is claimed is:

1. A thermoplastic elastomer composition comprising: (A) ethylene rubber by 10 to 90 wt %; and (B) propylene polymer by 10 to 90 wt %, where a total amount of the thermoplastic elastomer composition is 100 wt %,
wherein a pressed sheet obtained by press-molding the thermoplastic elastomer composition under molding conditions has a sink-in temperature of 115° C. or higher, where the sink-in temperature is measured based on JIS K7196-1991 as a temperature measured when a pressure load sinks in from a sheet surface by 100 μm, and
the molding conditions are such that the thermoplastic elastomer composition is hot press molded at a temperature of 200° C. with a maximum pressure of 10 MPa for 5 min, and thereafter cold press molded at a temperature of 23° C. with a maximum pressure of 10 MPa for 5 min, so as to prepare the pressed sheet.

2. The thermoplastic elastomer composition according to claim 1, wherein at least part of the (A) ethylene rubber is cross-linked.

3. The thermoplastic elastomer composition according to claim 1, further comprising: (E) mineral oil by 1 to 60 wt %, wherein the thermoplastic elastomer composition comprises the (A) ethylene rubber by 10 to 89 wt % and the (B) propylene polymer by 10 to 89 wt %, where a total amount of the thermoplastic elastomer composition is 100 wt %.

4. A sheet comprising: (A) ethylene rubber by 10 to 90 wt %; and (B) propylene polymer by 10 to 90 wt %, where a total amount of the sheet is 100 wt %,
wherein the sheet has a sink-in temperature of 115° C. or higher, where the sink-in temperature is measured based on JIS K7196-1991 as a temperature measured when a pressure load sinks in from a sheet surface by 100 μm.

5. The sheet according to claim 4, wherein at least part of the (A) ethylene rubber is cross-linked.

6. The sheet according to claim 4, further comprising:
(E) mineral oil by 1 to 60 wt %, wherein the sheet comprises the (A) ethylene rubber by 10 to 89 wt % and the (B) propylene polymer by 10 to 89 wt %, where a total amount of the sheet is 100 wt %.

* * * * *